United States Patent
Haapoja et al.

(10) Patent No.: US 11,836,877 B2
(45) Date of Patent: *Dec. 5, 2023

(54) SYSTEMS AND METHODS FOR GENERATING AUGMENTED REALITY CONTENT BASED ON DISTORTED THREE-DIMENSIONAL MODELS

(71) Applicant: SHOPIFY INC., Ottawa (CA)

(72) Inventors: Juho Mikko Haapoja, Toronto (CA); Byron Leonel Delgado, Ottawa (CA); Stephan Leroux, East Gwillimbury (CA); Daniel Beauchamp, Toronto (CA); Maas Mansoor Ali Lalani, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,387

(22) Filed: Jun. 21, 2022

(65) Prior Publication Data

US 2022/0319133 A1 Oct. 6, 2022

Related U.S. Application Data

(63) Continuation of application No. 17/029,463, filed on Sep. 23, 2020, now Pat. No. 11,398,079.

(51) Int. Cl.
*G06T 19/00* (2011.01)
*G06N 20/00* (2019.01)
(Continued)

(52) U.S. Cl.
CPC ........... *G06T 19/006* (2013.01); *G06N 20/00* (2019.01); *G06Q 30/0643* (2013.01);
(Continued)

(58) Field of Classification Search
None
See application file for complete search history.

(56) References Cited

U.S. PATENT DOCUMENTS 10,176,636 B1 1/2019 Neustein et al.
10,607,411 B1 * 3/2020 Pezzino ............ H04N 1/00201
(Continued)

FOREIGN PATENT DOCUMENTS

WO 2017029488 A2 2/2017

OTHER PUBLICATIONS

Constine, Josh. "Snapchat Acquires Looksery to Power Its Animated Lenses", Sep. 15, 2015, XP055851664. Retrieved from https://techcrunch.com/2015/09/15/snapchat-looksery. Retrieved on Oct. 15, 2021, 4 pages.
(Continued)

*Primary Examiner* — Ryan M Gray

(57) ABSTRACT

Systems and methods for generating AR content to virtually alter a real-world item are provided. The real-world item may be a deformable item including one or more flexible surfaces. According to an embodiment, a method includes determining the relative positions of a plurality of points on the real-world item. Based on the relative positions of the plurality of points, a 3D model of a virtual item is distorted to produce a distorted 3D model of the virtual item. The distorted 3D model may have substantially the same shape as the real-world item. AR content is then generated based on the distorted three-dimensional model.

20 Claims, 16 Drawing Sheets

(51) Int. Cl.
  *G06Q 30/0601* (2023.01)
  *G06T 15/20* (2011.01)
(52) U.S. Cl.
  CPC .... *G06T 15/20* (2013.01); *G06T 2207/20081* (2013.01); *G06T 2207/30204* (2013.01)

(56) References Cited

U.S. PATENT DOCUMENTS

| | | | |
|---|---|---|---|
| 11,398,079 B2* | 7/2022 | Haapoja | G06T 15/20 |
| 2012/0306918 A1 | 12/2012 | Suzuki et al. | |
| 2014/0168217 A1 | 6/2014 | Kim et al. | |
| 2015/0221069 A1 | 8/2015 | Shaburova et al. | |
| 2016/0275596 A1 | 9/2016 | Adeyoola et al. | |
| 2016/0300393 A1 | 10/2016 | Kinoshita | |
| 2016/0358374 A1 | 12/2016 | Ju et al. | |
| 2017/0039775 A1 | 2/2017 | Applegate et al. | |
| 2018/0342009 A1 | 11/2018 | Suzuki et al. | |
| 2019/0088033 A1 | 3/2019 | Kuchibotla et al. | |
| 2019/0333277 A1* | 10/2019 | Hariton | A63F 13/65 |
| 2020/0005386 A1* | 1/2020 | Blossey | G06T 19/006 |
| 2020/0034918 A1 | 1/2020 | Naware et al. | |
| 2020/0066029 A1* | 2/2020 | Chen | G06T 15/04 |
| 2020/0126316 A1* | 4/2020 | Sharma | G06T 17/20 |
| 2020/0184732 A1 | 6/2020 | Pezzino et al. | |
| 2020/0273093 A1* | 8/2020 | Mitchell | G06F 3/0482 |
| 2020/0320769 A1* | 10/2020 | Chen | G06F 18/214 |
| 2020/0349758 A1* | 11/2020 | Paulson | G06T 15/04 |
| 2021/0097758 A1* | 4/2021 | Baumberg | G06T 19/20 |
| 2021/0118239 A1* | 4/2021 | Santesteban | G06Q 10/067 |
| 2021/0133919 A1* | 5/2021 | Ayush | G06T 7/40 |
| 2022/0092857 A1 | 3/2022 | Haapoja et al. | |
| 2022/0198780 A1* | 6/2022 | Doba | G06F 16/538 |

OTHER PUBLICATIONS

"Why you should always buy a green guitar," 6 pages of screenshots. Video uploaded on Feb. 9, 2019 by Kmac2021. Retrieved Oct. 6, 2020. Video retrieved online via URL: https://www.youtube.com/watch?v=mk9IVc9HDdM.

Szeliski, Richard, "Computer Vision: Algorithms and Applications (Chapter 4: Feature detection and matching)", Sep. 3, 2010, pp. 205-266.

Rogge et al. "Monocular Pose Reconstruction for an Augmented Reality Clothing System". Vision, Modeling, and Visualization (Oct. 2011). 8 pages. Retrieved from https://www.researchgate.net/profile/Lorenz-Branz/publication/220839266_Monocular_Pose_Reconstruction_for_an_Augmented_Reality_Clothing_System/links/55bb402a08ae9289a0929217/Monocular-Pose-Reconstruction-for-an-Augmented-Reality-Clothing-System.pdf.

Scholz et al. "Garment Motion Capture Using Color-Coded Patterns". Eurographics 2005. vol. 24 (Sep. 2005), No. 3. 9 pages.

* cited by examiner

FIG. 2

SYSTEMS AND METHODS FOR GENERATING AUGMENTED REALITY CONTENT BASED ON DISTORTED THREE-DIMENSIONAL MODELS

CROSS-REFERENCE TO RELATED APPLICATIONS

This application is a continuation of U.S. patent application Ser. No. 17/029,463, entitled "Systems and Methods for Generating Augmented Reality Content based on Distorted Three-Dimensional Models", which was filed on Sep. 23, 2020, the contents of which are incorporated herein by reference in their entirety.

FIELD

The present application relates to augmented reality (AR) and, in particular embodiments, to the generation of AR content.

BACKGROUND

AR relates to the enhancement of real-world experiences using computer-generated or virtual content. In some cases, AR involves superimposing virtual content over physical real-world content. This superposition can be either constructive or destructive. Constructive AR adds content to a real-world experience, whereas destructive AR masks content in a real-world experience. In some cases, a given AR experience consists of a combination of constructive and destructive AR. AR differs from virtual reality (VR). VR relates to the creation of a completely virtual experience, whereas AR and the more recent variant mixed reality (MR) maintains at least a portion of the real-world experience, but alters the perception of that real-world experience using virtual content.

SUMMARY

Some aspects of the present disclosure relate to using a three-dimensional (3D) model to generate AR content that alters the appearance of a real-world item. The 3D model may provide a particular color, pattern and/or graphic for the real-world item that, when overlaid onto the real-world item in an AR experience, alters the appearance of the real-world item. In some cases, the real-world item may include one or more flexible surfaces, and therefore the shape of the real-world item may change over time. For example, the real-world item might be a garment being worn by a user. As the user moves, the garment may flow, crease and/or fold as a result. Altering the physical appearance of a real-world item while the item is changing shape is a challenge faced by AR systems.

In some embodiments, to alter the appearance of a real-world item using AR, a system determines the shape of the real-world item, distorts a 3D model of the item to match the shape of the real-world item, and generates AR content based on the distorted 3D model. The AR content may include a render of the distorted 3D model that is overlaid on an image of the real-world item, which could alter the appearance of the real-world item from the perspective of a user viewing the AR content. In this way, the AR content can conform to the real-time shape of the real-world item.

According to an aspect of the present disclosure, there is a computer-implemented method including determining relative positions of a plurality of points on a real-world item and distorting, based on the relative positions of the plurality of points, a 3D model of a virtual item to produce a distorted 3D model of the virtual item. The method may further include generating AR content for presentation. This AR content may be based on the distorted 3D model. In some cases, the real-world item may include a flexible surface and/or may be or include a garment. Further, the 3D model may include a visual appearance for the real-world item.

In some embodiments, generating the AR content includes rendering the distorted 3D model. Optionally, the distorted 3D model is rendered from a viewpoint corresponding to a captured image of the real-world item. Generating the AR content may further include compositing the rendering with the image to overlay the real-world item.

In some embodiments, the method further includes determining a position of a user relative to the real-world item. The distorted 3D model may be rendered based on this position of the user. The render may then be overlaid with the user's viewpoint of the real-world item through a transparent display, for example.

In some embodiments, the distorting of the 3D model of the virtual item based on the relative positions of the plurality of points includes modifying the 3D model to reposition points in the 3D model to be in relative positions corresponding to the relative positions of the plurality of points.

In some embodiments, the real-world item includes a plurality of markers, each of the plurality of markers being at a respective different one of the plurality of points on the real-world item. Determining the relative positions of the plurality of points on the real-world item may then include determining relative positions of the plurality of markers. In some embodiments, the plurality of markers includes optical markers and the method further includes obtaining at least one image of the real-world item. Determining the relative positions of the plurality of markers may then include performing image analysis on the at least one image to detect the optical markers.

In some embodiments, determining the relative positions of the plurality of points on the real-world item includes obtaining measurements of the real-world item; inputting the measurements into a machine learning (ML) model; and obtaining an output of the ML model, where the relative positions of the plurality of points on the real-world item are based on the output of the ML model.

In some embodiments, the relative positions of the plurality of points are first relative positions of the plurality of points, the distorted model of the virtual item is a first distorted model of the virtual item, and the AR content is first AR content. The first relative positions of the plurality of points might correspond to the real-world item in a first shape. The method may further include determining second relative positions of the plurality of points on the real-world item, the second relative positions corresponding to the real-world item in a second shape; distorting, based on the second relative positions of the plurality of points, the 3D model of the virtual item to produce a second distorted 3D model of the virtual item; and generating second AR content for presentation, the second AR content being based on the second distorted 3D model.

In some embodiments, the relative positions of the plurality of points on the real-world item are based on measurements obtained from a device, and the AR content is for presentation at that device.

In some embodiments, the 3D model of the virtual item is a first 3D model of the virtual item, the relative positions of the plurality of points are first relative positions of the plurality of points, and the AR content is first AR content. The method might further include obtaining an instruction to replace the first 3D model of the virtual item with a second 3D model of the virtual item, the instruction originating from user input at a device; determining second relative positions of the plurality of points on the real-world item; distorting, based on the second relative positions of the plurality of points, the second 3D model of the virtual item to produce a distorted second 3D model of the virtual item; and generating second AR content for presentation, the second AR content being based on the distorted second 3D model.

According to another aspect of the present disclosure, there is provided a system including memory to store models, measurements, positions and/or instructions, for example, and one or more processors configured to perform any method disclosed herein.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein:

FIG. 2 is an example of a home page of an administrator, according to an embodiment;

DETAILED DESCRIPTION

For illustrative purposes, specific example embodiments will now be explained in greater detail below in conjunction with the figures.

Example E-Commerce Platform

In some embodiments, the methods disclosed herein may be performed on or in association with a commerce platform, which will be referred to herein as an e-commerce platform. Therefore, an example of an e-commerce platform will be described.

Figure 1:
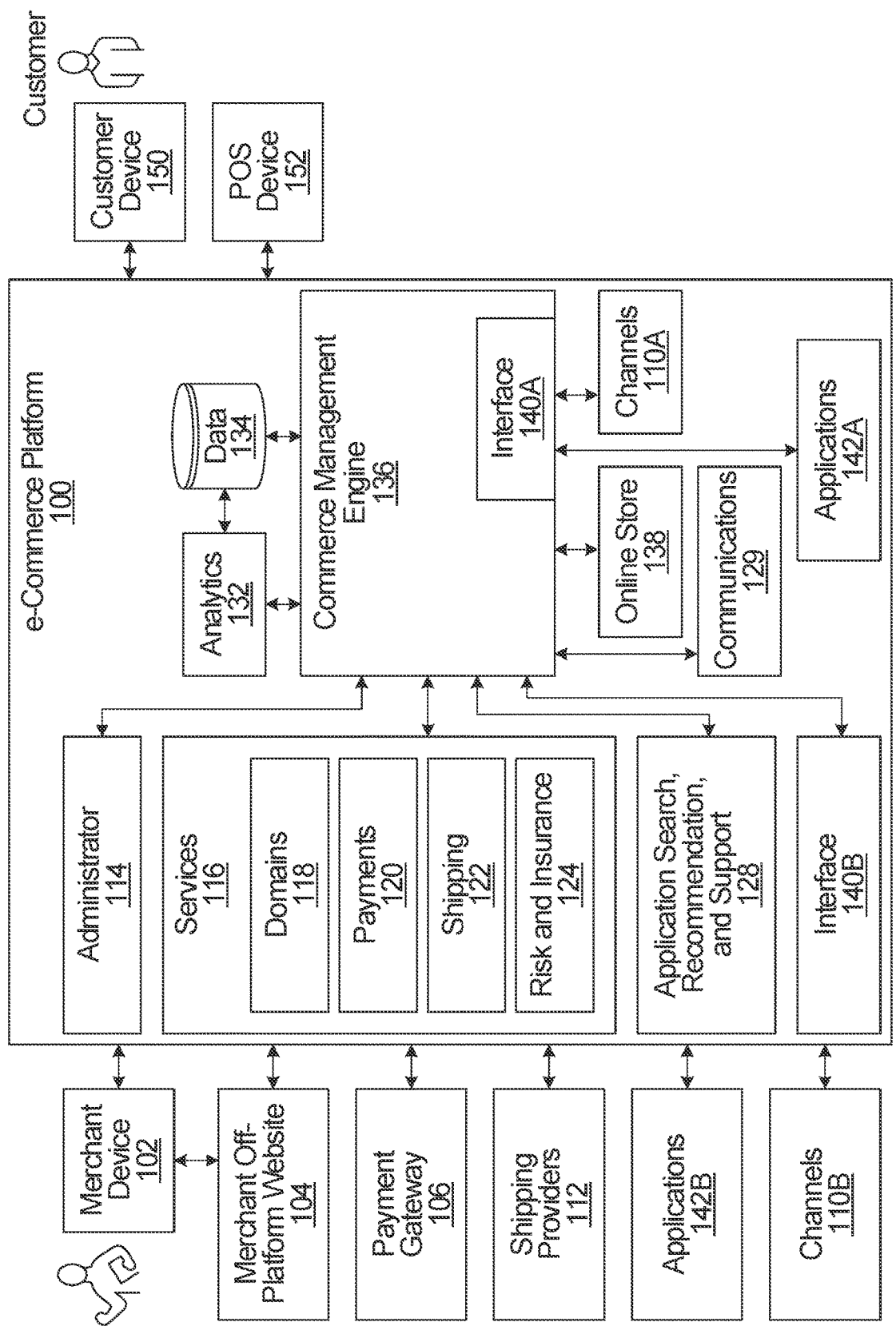
FIG. 1 is a block diagram of an e-commerce platform, according to an embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
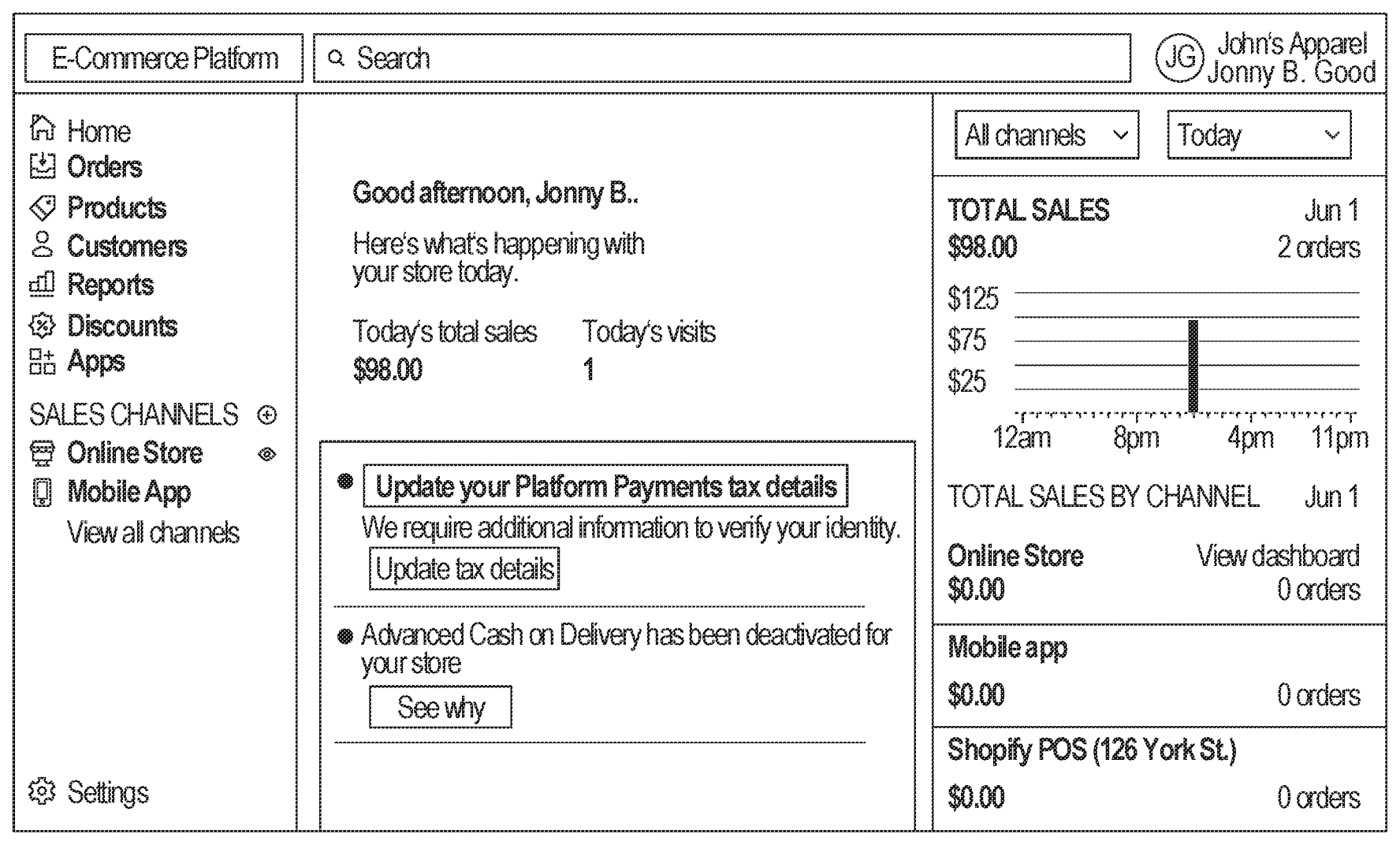

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

Figure 3:
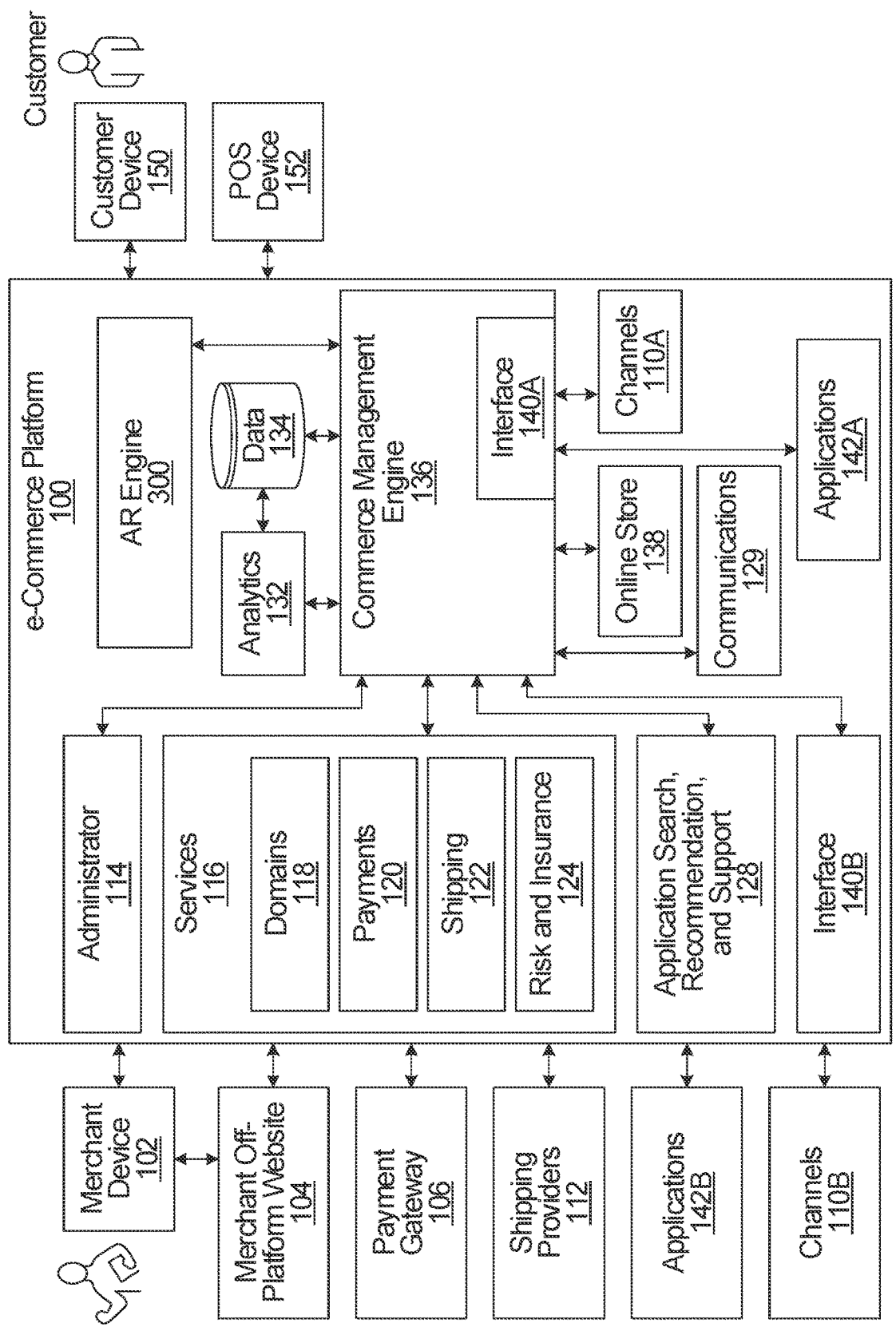
FIG. 3 illustrates the e-commerce platform of FIG. 1, but including an AR engine.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that Implementation of Augmented Reality in an E-Commerce Platform Technologies such as augmented reality (AR) and mixed reality (MR) that use virtual content to alter a real-world experience—generally denoted herein as "AR"—may be used in commerce to provide improved customer experiences. The e-commerce platform 100 may implement AR for any of a variety of different applications, examples of which are described elsewhere herein. FIG. 3 illustrates the e-commerce platform 100 of FIG. 1, but including an AR engine 300. The AR engine 300 is an example of a computer-implemented system that generates AR content for use by the e-commerce platform 100, the customer device 150 and/or the merchant device 102.

Although the AR engine 300 is illustrated as a distinct component of the e-commerce platform 100 in FIG. 3, this is only an example. An AR engine could also or instead be provided by another component residing within or external to the e-commerce platform 100. In some embodiments, either or both of the applications 142A-B provide an AR engine that is available to customers and/or to merchants. Furthermore, in some embodiments, the commerce management engine 136 provides an AR engine. The e-commerce platform 100 may include multiple AR engines that are provided by one or more parties. The multiple AR engines may be implemented in the same way, in similar ways and/or in distinct ways. In addition, at least a portion of an AR engine may be implemented in the merchant device 102 and/or in the customer device 150. For example, the customer device 150 may store and run an AR engine locally as a software application.

The AR engine 300 may implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all. In general, any applications of AR could implement the systems and methods disclosed herein.

Applications of AR in Commerce

AR (or its variants) can supplement a user's real-world environment with virtual content to alter the user's perception of the real-world environment. In some implementations, through a process known as simultaneous localization and mapping (SLAM), a representation of a user's real-world environment and a position of the user within that real-world environment can be continuously or intermittently determined by an AR engine, for example. It should be noted that, as used herein, a position can include both an orientation and a location. An AR experience for the user can be generated by mapping one or more virtual models to the representation of the real-world environment. AR content for the user may include a render of a virtual model that is overlaid onto the real-world environment. The render may be generated to reflect the relative position of the user in the real-world environment and the mapping of the virtual model to the real-world environment. In this way, the AR content may provide near-seamless integration of the virtual model with the real-world environment for the user.

In some implementations, an AR experience may be provided by tracking markers (such as quick response (QR) codes, for example), facial features (such as a user's eyes and/or nose, for example), and/or other features in a real-world environment. These features may then be removed and/or altered using virtual content in the AR experience.

AR can allow a customer to view and interact with a virtual product when the customer is not able to physically interact with a real-world product. For example, AR may overlay a virtual representation of a product onto a real-world environment that is captured in an image, which can make the product appear to be present in the real-world environment. The image could be of the customer's home or another location that is relevant to the customer, allowing the customer to view the product in an environment that is of interest to them. In some implementations, furniture retailers may use AR to enable customers to view virtual furniture within their homes. For example, a virtual representation of a television can be superimposed onto a video stream of a customer's living room using AR, allowing the size and look of the television in the living room to be appreciated.

AR may be used to reduce a merchant's need to stock numerous different variants of a product in a "brick and mortar" retail store. For example, some products may be available in different variants that have the same shape and functionality but differ in their visual appearance. Non-limiting examples of such product variants include different colors, patterns, textures and/or graphic designs for a product. When a merchant is selling a product through a retail store, maintaining a large number of product variants in stock typically requires a large storage space. Further, physically showing a customer many different product variants may be time consuming and result in the customer losing interest.

By way of example, some furniture may be available in many different variants, but a retail store might not have sufficient storage space to stock all of the variants. AR may be used to show virtual representations of many different variants of furniture to the customer in a relatively rapid manner, without having to physically store the variants.

Clothing is another type of product that may be presented to a customer using AR. Smart mirrors and other devices with AR capabilities can be used to overlay virtual representations of clothing on a body part of a customer in a retail store. This may be considered a smart dressing room. The customer can then assess the look and the fit of the clothing, even if the merchant does not have a physical article of the clothing in stock. In addition, the customer can rapidly switch between different variants of the clothing without having to physically put different articles of clothing on, which may be time consuming.

A drawback of using AR to create virtual representations of products is that many customers wish to physically interact with a product before deciding whether or not to purchase the product. Consider, for example, a customer that is interested in purchasing an article of clothing. A virtual representation of an article of clothing overlaid on a body part of a customer may not provide enough information for the customer to decide whether or not to purchase the clothing. While the virtual representation might provide the customer with an indication of how the clothing looks, because the clothing is merely overlaid on the customer's body, the customer is not able to assess the material, drape, feel and construction of the clothing. Furthermore, a static virtual representation of an article of clothing may fail to demonstrate some aesthetic features of the clothing, including how the clothing creases and flows as the customer moves. For example, it may be that a static representation of an article of clothing appears more akin to a paper doll's clothes than to a physical article of clothing that, when worn, flows and moves about a wearer's body.

Accordingly, a need exists for systems and methods that allow a customer to physically interact with a product and view multiple different variants of the product, without requiring a merchant to physically store each variant.

It should be noted that while some embodiments are described in the context of commerce applications, the present disclosure is in no way limited to commerce. The systems and methods disclosed herein can also be implemented in other applications of AR.

Generating AR Content Using Distorted 3D Models

The present disclosure relates, in part, to generating AR content to overlay a real-world item and then alter the real-world item. In retail store applications, this may allow a customer to physically interact with a single real-world item of a product while using AR to view multiple different variants of the product. As a result, a merchant may be able to reduce the total number of items that are stored in their inventory. In online shopping applications, a merchant could ship a single real-world item of a product to a customer and allow the customer to use AR to view multiple different variants of the product. This may reduce shipping costs for the merchant and/or the customer, as only one item needs to be shipped.

By way of example, a limited number of blank or generic items of a product could be stocked in a retail store. A blank item may be an item of a single solid color, but as discussed below, this might not always be the case. A customer may use a blank item to physically interact with the product and appreciate the feel, fit, movement and/or other physical characteristics of the product. AR may then be implemented to depict different visual variants of the product on the blank item, allowing the customer to view the different variants. For example, different product colors, patterns and/or graphic designs could be presented to the customer using AR. The customer may then order a specific variant of the product.

Blank items may only be intended for use in a retail store and might not be sold to customers. Alternatively, a blank item may be a basic version of a product, such as a beige couch or a solid colour garment, for example. In the case of a customer shopping for a couch, a blank couch could be available in a retail store to allow the customer to sit on the couch, while AR is used to demonstrate all of the different colors, patterns, textures and graphic designs that are available for the couch. Similarly, in the case of a customer shopping for a shirt, blank shirts in multiple different sizes could be available in a retail store to help the customer choose a size of the shirt. Different visual appearances can be applied onto the blank shirts using AR to help the customer decide which variant of the shirt they prefer. The different visual appearances could be applied when the customer is wearing the shirt and/or when the shirt is hanging on a rack or otherwise being displayed in the retail store. Stocking blank items of a product in a retail store might reduce theft in some cases, as the blank items might not be the most desirable variants of the product. In some cases, a blank item may be specifically branded or marked as such including potentially by way of a notice or lettering printed prominently on the blank item.

Many products are soft, flexible, malleable or otherwise deformable. Therefore, the shape of these products is not fixed, but can change based on any of a number of different factors. Consider a cotton shirt, for example. The shape of the shirt can change based on, inter alia, how it is worn, how it is moved, how it is held and how it is oriented. When using AR to alter the visual appearance of a deformable item, real-time knowledge of the 3D shape of the item may be required to realistically overlay a new visual appearance on the real-world item.

In some embodiments, measurements of a deformable real-world item are obtained to help determine the 3D shape of the real-world item. These measurements may include optical images, lidar scans and/or radar scans, for example. Analysis of the measurements may then determine the 3D positions, or relative positions, of multiple points on the item that provide the approximate 3D shape of the real-world item. Increasing the number of points on the real-world item that are measured may allow the shape of the real-world item to be determined more accurately. Analysis of the measurements may also determine the position of a user device relative to the real-world item.

After the relative positions of multiple points on a real-world item are determined, AR content corresponding to the item may be generated for a user. This AR content generally includes a render of a 3D model of the item that is overlaid with the real-world item from the perspective of the user. In some cases, the 3D model can provide a new visual appearance for the item. For example, the 3D model could provide a pattern, color and/or graphic design that may be overlaid with a real-world item to depict a certain product variant.

In some embodiments, generating AR content may include modifying, deforming or distorting a 3D model of the item such that a shape of the modified model corresponds to a measured 3D shape of the item. This distortion can be based on measured relative positions of multiple points on the real-world item. For example, multiple points on the 3D model can be mapped to the relative positions of multiple points on the real-world item. During the mapping, parts of the 3D model may be repositioned or otherwise altered, which can recreate the 3D shape of the real-world item in the shape of the 3D model.

An advantage of distorting a 3D model based on the measured 3D shape of a real-world item is that the real-time deformation of the item can be reflected in the 3D model, allowing a render of the 3D model to properly match and overlay the real-world item in a realistic manner. For example, any bends, folds, ripples or other deformation in the real-world item can be captured in the modified 3D model. This may be thought of as the 3D model being "shrink wrapped" to the real-world item. Modifying the 3D model may be particularly important when the 3D model includes a complex pattern that cannot be easily overlaid with a deformed item. For example, when trying to virtually recreate a zebra print pattern on a blank couch, a 3D model providing the pattern could be modified in response to a person sitting on the couch and deforming the couch. As such, the zebra print pattern is actively conformed to the shape of the couch.

Furthermore, distorting a 3D model based on the measured shape of the real-world item may enable the movement and flow of a flexible surface to be captured. For items such as clothing and garments, this can capture important aesthetic aspects of these items. By way of example, a customer may want to see how the pattern on a shirt looks as the shirt moves, folds and creases.

In contrast, consider a case in which the 3D shape of a real-world item is not determined when generating AR content to overlay the item. Instead, only a 2D outline of the item is determined. AR content then overlays a pattern within the outline of the item. This may be done using chroma key compositing, for example, where the item is separated from the surrounding environment based on color. A selected pattern can then be superimposed over the item. When the item is not deformable and/or the pattern is a uniform color, this approach might provide a suitable virtual appearance for the item. However, if the pattern is non-uniform and the item is deformable, chroma key compositing can fail to realistically overlay the pattern on the deformed item. For example, if the item is a shirt with folds and the pattern is a checkered pattern, then chroma key compositing would likely not accurately depict the pattern in the area of the folds. This is because chroma key compositing can only detect the boundaries of the shirt from a single perspective, and not the 3D shape of the shirt.

Following the generation of AR content for a deformable real-world item, the AR content can be output to a device and overlaid with the real-world item. The AR content can be updated as a user moves relative to the item to ensure that the render of the 3D model matches the size and orientation of the item from the perspective of the user. Updating the AR content may include distorting the 3D model in real-time to match any deformation of the item captured in a video, for example. Further, the user can actively switch between different 3D models of the item to obtain different physical appearances of the item. This can allow a customer to view different variants of a product, for example.

Figure 4:
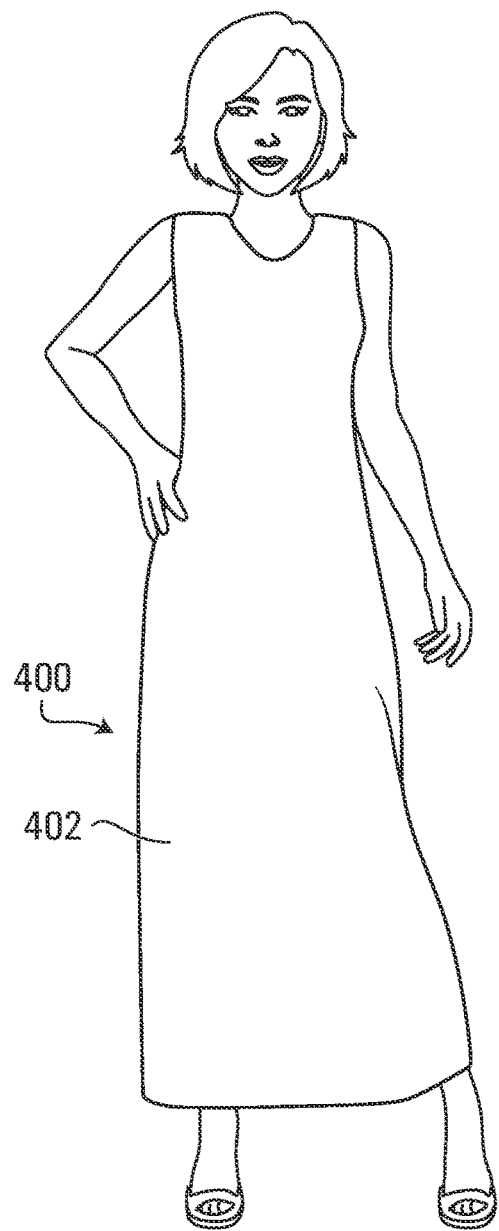
FIGS. 4 and 5 illustrate a user wearing a dress at a first instance in time and at a second instance in time, respectively, according to an embodiment.
Figure 5:
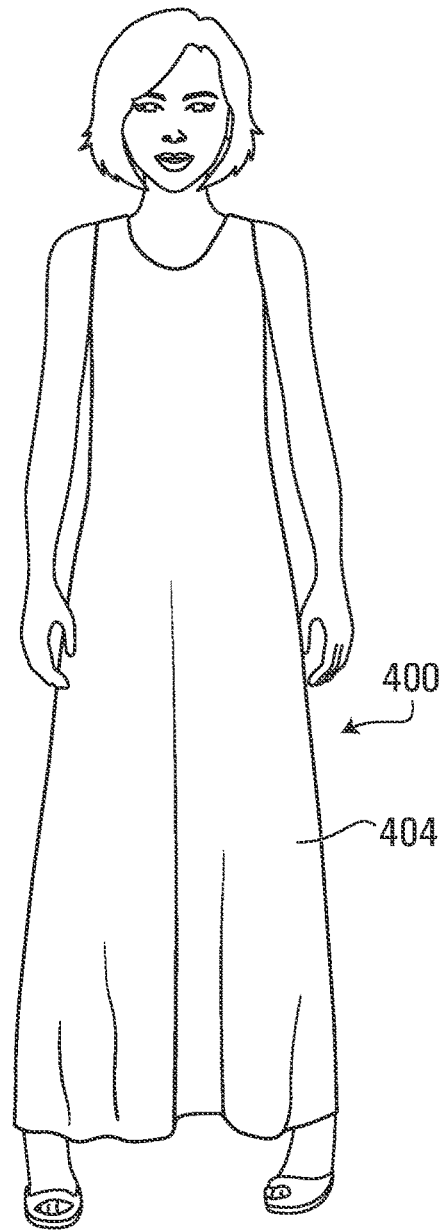

FIGS. 4 and 5 illustrate a user wearing a dress 400 at a first instance in time and at a second instance in time, respectively, according to an embodiment. The dress 400 is a plain white flexible garment. The dress 400 has a first 3D shape 402 at the first instance in time and a second 3D shape 404 at the second instance in time. As shown, the 3D shape 402 differs from the 3D shape 404. This change in shape may be caused by the user moving, thereby altering the curves, folds and creases in the fabric of the dress 400, for example.

Figure 6:
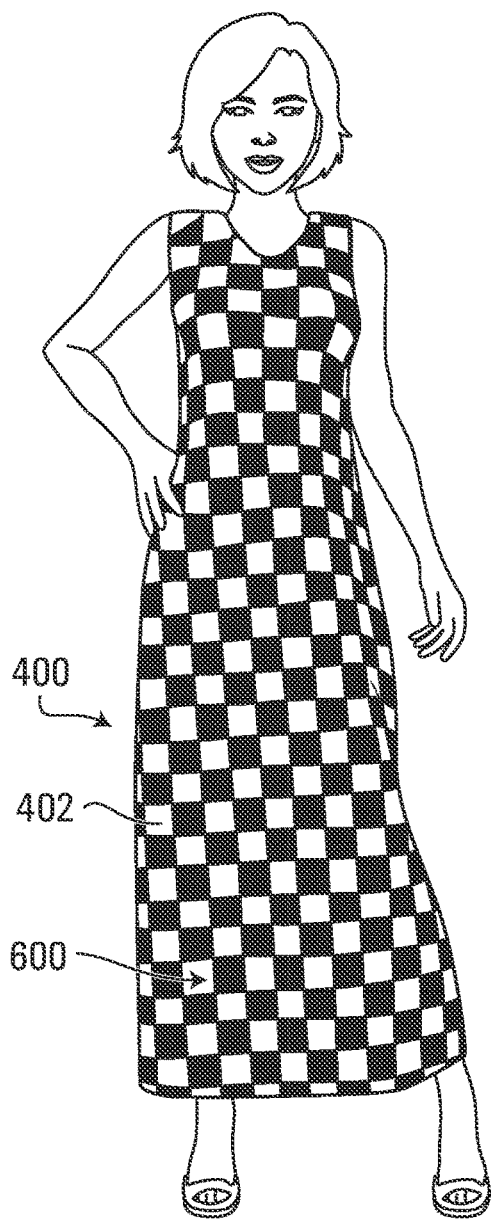
FIGS. 6 and 7 illustrate the user wearing the dress of FIGS. 4 and 5 at the first instance in time and at the second instance in time, respectively, but with a virtual pattern overlaid onto the dress.
Figure 7:
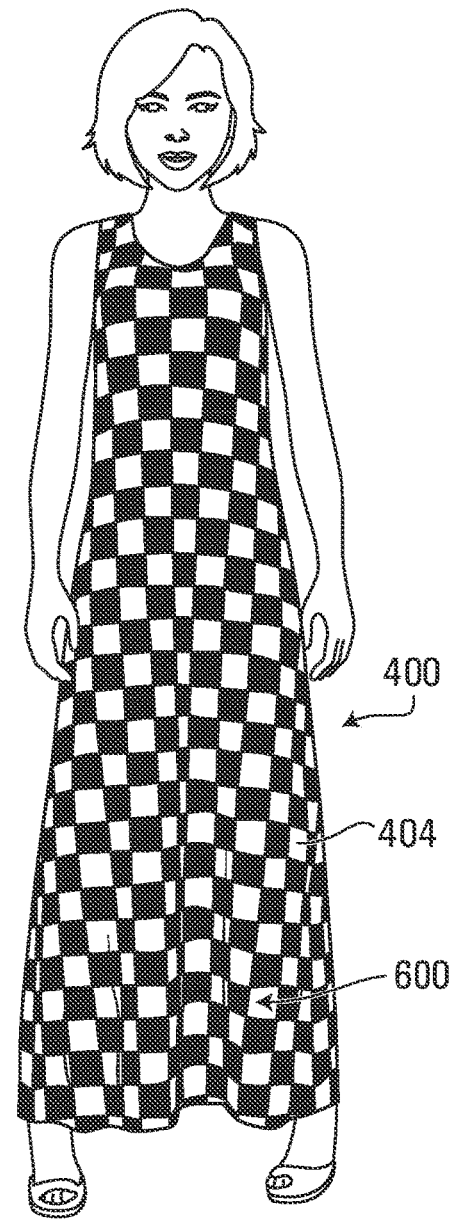

FIGS. 6 and 7 illustrate the user wearing the dress 400 at the first instance in time and at the second instance in time, respectively, but with a virtual pattern 600 overlaid onto the dress 400. The virtual pattern 600 may be provided by AR content that depicts a variant of the dress 400 having a checkered pattern. In some implementations, the virtual pattern 600 corresponds to a 3D model of the dress 400. The 3D model may be distorted based on the 3D shape 402 of the dress 400 at the first instance in time. A render of the distorted 3D model may then be used to provide the virtual pattern 600 shown in FIG. 6. Similarly, after distorting the 3D model based on the 3D shape 404 of the dress 400 at the second instance in time, a render of the distorted 3D model may be used to provide the virtual pattern 600 shown in FIG. 7.

Because the virtual pattern 600 is based on the 3D shapes 402, 404 in FIGS. 6 and 7, the virtual pattern 600 is realistically depicted in the curves and folds of the dress 400. In this way, the virtual pattern 600 may better represent how the variant of the dress 400 with a checkered pattern would appear in real-life.

The virtual pattern 600 illustrated in FIGS. 6 and 7 is an example of AR content that may be generated using the systems and methods disclosed herein.

Example Systems and Methods for Generating AR Content

Figure 8:
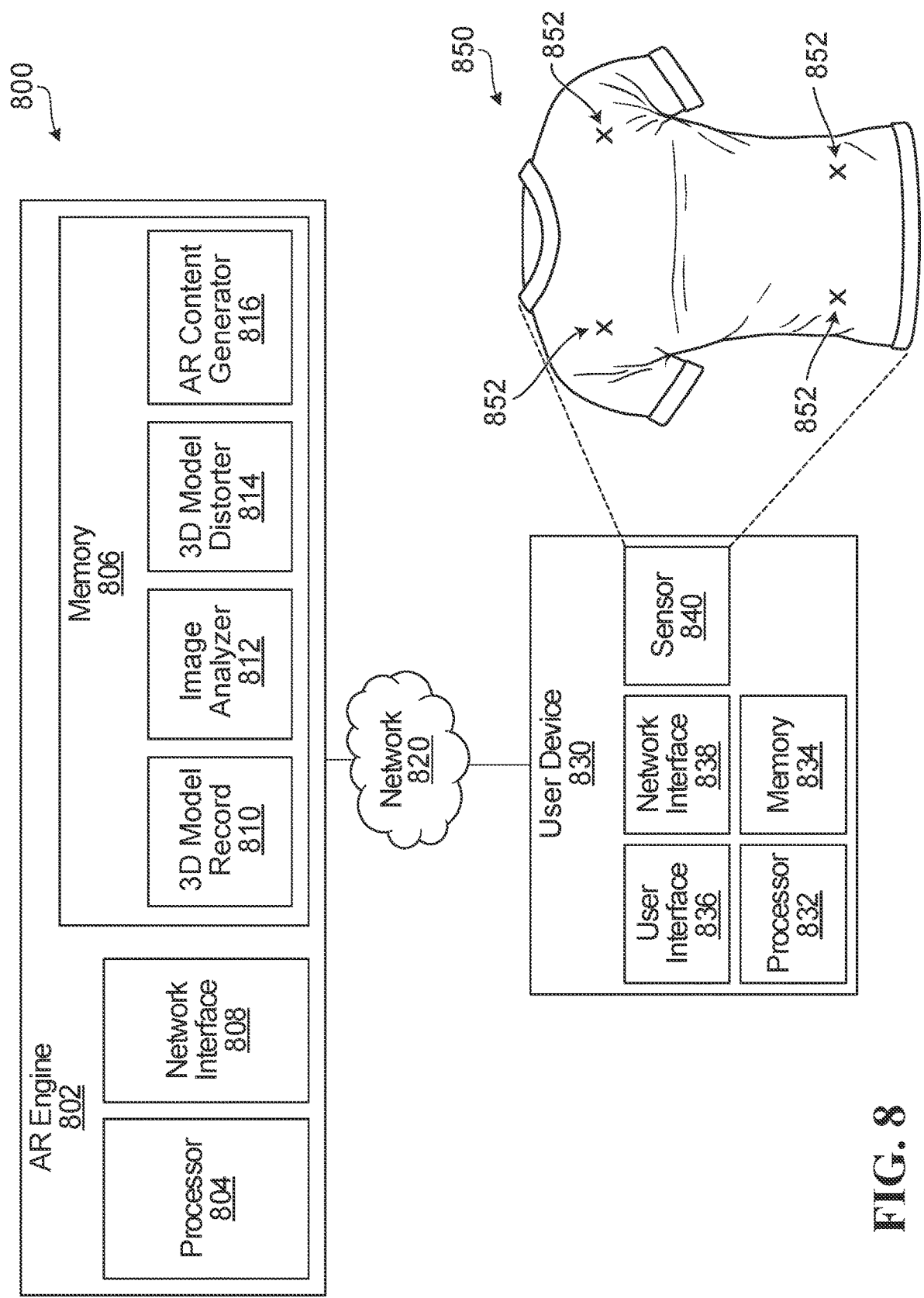
FIG. 8 is a block diagram illustrating a system for generating AR content using a distorted 3D model, according to an embodiment.

FIG. 8 is a block diagram illustrating a system 800 for generating AR content using a distorted 3D model, according to an embodiment. The system 800 includes an AR engine 802, a network 820, a user device 830 and a physical, real-world item 850.

In some implementations, the real-world item 850 is an item of a particular product which the user associated with the user device 830 may intend to virtually alter using the AR engine 802 and/or the user device 830. For example, the real-world item 850 may be overlaid with different colors, patterns and/or designs using AR to depict different variants of the product. The real-world item 850 may be considered a blank item of the product.

The real-world item 850 is illustrated as a shirt, but this is only an example. The real-world item 850 could more generally be any object or entity. In some implementations, the real-world item 850 includes one or more flexible surfaces. A flexible surface is generally one that is malleable, deformable or otherwise capable of changing shape. Non-limiting examples of flexible surfaces include surfaces made from fabrics, plastics and rubber. In some implementations, the real-world item 850 is or includes a garment.

The user device 830 may be or include a mobile phone, tablet, laptop, projector, headset and computer. The user device 830 may be a customer device that is owned and/or operated by a customer or be a merchant device that is owned and/or operated by a merchant, for example.

The user device 830 includes a processor 832, memory 834, user interface 836, network interface 838 and sensor 840. The user interface 836 may include, for example, a display screen (which may be a touch screen), a gesture recognition system, a speaker, headphones, a microphone, haptics, a keyboard, and/or a mouse. The user interface 836 can present AR content to a user, including visual, haptic and audio content. In some implementations, the user device 830 includes implanted devices or wearable devices, such as a device embedded in clothing material or a device that is worn by a user such as glasses, with built-in displays allowing a user to view the real-world and simultaneously view AR content that is overlaid on the real-world.

The network interface 838 is provided for communicating over the network 820. The structure of the network interface 838 will depend on how the user device 830 interfaces with the network 820. For example, if the user device 830 is a mobile phone, headset or tablet, then the network interface 838 may include a transmitter/receiver with an antenna to send and receive wireless transmissions to/from the network 820. If the user device is a personal computer connected to the network with a network cable, then the network interface 838 may include, for example, a network interface card (NIC), a computer port, and/or a network socket. The processor 832 directly performs or instructs all of the operations performed by the user device 830. Examples of these operations include processing user inputs received from the user interface 836, preparing information for transmission over the network 820, processing data received over the network 820, and instructing a display screen to display information. The processor 832 may be implemented by one or more processors that execute instructions stored in the memory 834. Alternatively, some or all of the processor 832 may be implemented using dedicated circuitry, such as an application specific integrated circuit (ASIC), a graphics processing unit (GPU) or a programmed field programmable gate array (FPGA).

The sensor 840 may include one or more cameras, radar sensors, lidar sensors and/or sonar sensors, for example. Although the sensor 840 is shown as a component of the user device 830, the sensor 840 may also or instead be implemented separately from the user device 830 and may communicate with the user device 830 and/or the AR engine 802 via wired and/or wireless connections, for example.

The sensor 840 may obtain measurements of a real-world space to help provide an AR experience for the user of the user device 830. For example, the sensor 840 may perform at least a portion of a SLAM process. In some implementations, measurements obtained by the sensor 840 are used to help determine the shape of the real-world item 850. These measurements may provide the relative positions of multiple points 852 on the real-world item 850. The points 852 may correspond to defined patterns, features, structures, parts or sites on the real-world item 850 that are detectable and/or localizable by the sensor 840. For example, each of the points 852 may correspond to a location along a seam between fabrics on the real-world item 850. After determining the relative positions of the points 852, the overall shape of the real-world item 850 may be approximated or estimated. In some implementations, measurements of the real-world item 850 obtained by the sensor 840 are transmitted to the AR engine 802 for analysis to determine the relative positions of the points 852.

It should be noted that the number and the positions of the points 852 on the real-world item 850 are provided by way of example only. In general, the measurements obtained by the sensor 840 could help determine the relative positions of any number of points on the real-world item 850. For example, the positions of tens, hundreds, thousands, tens of thousands, hundreds of thousands or millions of points may be determined on the real-world item 850. In some cases, determining the position of a larger number of points on the real-world item 850 may increase the accuracy and precision with which the shape of the real-world item 850 is estimated. Increasing the resolution of the sensor 840 may increase the number of points on the real-world item 850 that can be detected and localized. A relatively high sensing resolution may be implemented to detect small shape variations such as folds or creases in a flexible surface of the real-world item 850.

In some implementations, the points 852 correspond to the location of markers that are incorporated on or into the real-world item 850. Each of these markers may be a physical structure or device that is detectable through measurements. Non-limiting examples of different types of markers include optical markers, radio wave markers, inertial markers and magnetic markers. The markers might not be inherent to the real-world item 850, but might be additional elements that are added to the real-world item 850. For example, the real-world item 850 might be a blank item containing markers that are specifically added to allow the shape of the real-world item 850 to be determined. By implementing the markers at the points 852 on the real-world item 850, the positions of the points 852 may be determined by detecting and localizing the markers.

Optical markers may be detectable through optical images. For example, colors, symbols, patterns, light emitters and/or light reflectors may be implemented in an optical marker and be detectable through an optical image. Multiple optical images may be used to determine the position of a marker or at least the relative position of a marker to other markers. Notably, in some cases optical markers may be occluded due to folds, position of the wearer's body, etc. In some implementations, the fact that one or more markers are occluded while other markers are visible may be used to detect and/or employed in detecting folds in flexible items. Additionally or alternatively, in some implementations, computer readable codes or indicia, such as barcodes and quick response (QR) codes, for example, are used as optical markers. These computer readable codes may provide information that allows each marker to be differentiated on a real-world item. For example, when multiple QR codes are implemented on a real-world item, each QR code might provide information indicating that the QR code corresponds to a particular point on the item.

A radio wave marker may include a radio frequency identification (RFID) transponder that can be detected and localized by a RFID reader. Inertial markers may include inertial sensors that are incorporated into an item and can transmit inertial data, which may be analyzed to determine the position of the sensor. Magnetic markers may include magnets that are detected and localized through magnetic flux measurements, for example.

The network 820 may be a computer network implementing wired and/or wireless connections between different devices, including the AR engine 802 and the user device 830. The network 820 may implement any communication protocol known in the art. Non-limiting examples of communication protocols include a local area network (LAN), a wireless LAN, an internet protocol (IP) network, and a cellular network.

The AR engine 802 supports the generation of AR content, including AR content based on distorted 3D models. As illustrated, the AR engine 802 includes a processor 804, memory 806 and a network interface 808. The processor 804 may be implemented by one or more processors that execute instructions stored in the memory 806 or in another computer readable medium. Alternatively, some or all of the processor 804 may be implemented using dedicated circuitry, such as an ASIC, a GPU, or a programmed FPGA.

The network interface 808 is provided for communication over the network 820. The structure of the network interface 808 is implementation specific. For example, the network interface 808 may include a NIC, a computer port (e.g., a physical outlet to which a plug or cable connects), and/or a network socket.

The memory 806 stores a 3D model record 810, an image analyzer 812, a 3D model distorter 814 and an AR content generator 816.

The 3D model record 810 may include virtual 3D models of items, objects, buildings, locations, scenery, people, anatomical features, animals and/or any other type of entity. A 3D model is a mathematical representation of an entity that is defined with a length, width and height. A 3D model may be positioned or otherwise defined within a 3D virtual coordinate system, which could be a cartesian coordinate system, a cylindrical coordinate system or a polar coordinate system, for example. A 3D model might be anchored to the origin of the virtual coordinate system such that the 3D model is at the center of the virtual coordinate system. A 3D model may be entirely computer-generated or may be generated based on measurements of a real-world entity. Possible methods for generating 3D models from a real-world entity include photogrammetry (creating a 3D model from a series of 2D images) and 3D scanning (moving a scanner around the entity to capture all angles).

A 3D model may be implemented in an AR experience to allow a virtual item to be viewed at various different angles within the AR experience. Further, when a user is interacting with the AR experience using a device with 3D capabilities (such as a headset, for example), the 3D model may allow for 3D representations of the virtual item to be generated. For example, 3D representations of the virtual item might be achieved by displaying slightly different perspectives of the virtual item in each eye of a user, giving the object a 3D effect.

A 3D model stored in the 3D model record 810 may also have associated audio content and/or haptic content. For example, the 3D model record 810 could store sounds made by or otherwise associated with a model and/or haptic feedback that can provide a feel for a model.

In some implementations, one or more 3D models stored in the 3D model record 810 provide different variants for products. For example, multiple 3D models may be based on the same product, but all may have different visual, audio and/or haptic content that reflects different variants of the product. As discussed elsewhere herein, these 3D models may be overlaid onto a real-world item of that product to present these different variants to a user.

It should be noted that a 3D model stored in the 3D model record 810 might represent only a portion of a product. In one example, a 3D model represents a logo for a shirt, which may be implemented to overlay the logo onto an image of a real-world shirt worn by a user. This may depict a variant of the shirt that includes the logo. In another example, a 3D model represents a bell that may be overlaid onto an image of a real-world bicycle to depict a variant of the bicycle that includes the bell.

The 3D models in the 3D model record 810 could be obtained in any of a number of different ways. In some implementations, at least some of the 3D models are obtained from a user of the AR engine 802, such as from a customer or a merchant, for example. A merchant could generate one or more 3D models for any, one, some or all of the products sold in their stores. These 3D models may be provided directly to the AR engine 802 by the merchant, or the AR engine 802 may obtain the 3D models from a merchant's account on an e-commerce platform and/or from the merchant's online store. 3D models may also be obtained from other platforms such as social media platforms, for example. In addition, some 3D models may be generated locally at the AR engine 802. For example, images or scans that are obtained by the AR engine 802 can be used to generate a 3D model.

The image analyzer 812 is provided to analyse images received and/or stored by the AR engine 802. The image analyzer 812 may implement at least a portion of a SLAM process for an AR experience. For example, the image analyzer 812 could generate a representation of a real-world space from one or more images of the real-world space and localize a user and/or a user device within that real-world space. The representation of the real-world space may include surfaces, edges and/or corners defined within a virtual coordinate system.

In some implementations, the image analyzer 812 is used to analyse images received from the sensor 840 to help determine the relative positions of multiple points on a real-world item, such as the points 852 on the real-world item 850. By way of example, image analysis may detect the features of a real-world item, such as the surfaces, edges and/or corners of the real-world item, and determine the dimensions and relative positions of these features in 3D. The relative positions of the features may then be used to obtain relative positions of multiple points on the real-world item.

More than one image could be input into the image analyzer 812. For example, multiple images of a real-world item taken from different positions could allow for the detection and localization of a larger number of points on a real-world item. The multiple images could be obtained from a video stream and/or from multiple different cameras, for example. In cases where the image analyzer 812 receives a video stream of a real-world item, the image analyzer 812 could perform an initial feature detection operation to locate the features of the real-world item. These features could then be tracked in subsequent images received from the video stream in real-time. New features that are detected in the subsequent images could be used to determine the relative positions of more points on the real-world item.

The image analyzer 812 may be implemented in the form of software instructions that are executable by the processor 804. Any of a number of different algorithms could be included in the image analyzer 812. Non-limiting examples of such algorithms include:
Surface, corner and/or edge detection algorithms;
Object recognition algorithms;
Motion detection algorithms; and
Image segmentation algorithms.

Further details regarding image analysis algorithms can be found in *Computer Vision: Algorithms and Applications* by Richard Szeliski, ISBN: 978-1-84882-935-0 (Springer, 2010), the contents of which are herein incorporated by reference in their entirety.

Markers that are incorporated into a real-world item may be detected and localized by the image analyzer 812. These markers may be configured such that they are relatively easily detectable through image analysis. For example, bright colors, light emitters and/or light reflectors on a real-world item may be relatively easily detectable through image analysis. The image analyzer 812 may also be configured to read a machine-readable code provided by a marker to determine which point on a real-world item the marker corresponds to.

The image analyzer 812 may implement one or more machine learning (ML) models to analyze images of a real-world item and determine the relative positions of multiple points on the item. The item may include markers that are detected and localized by the ML model, but this might not always be the case. The ML model might instead be trained to localize certain inherent physical characteristics of the item.

According to one example, a training data set for an ML model implemented by the image analyzer 812 is generated by incorporating RFID transponders at multiple points on a real-world item. The RFID transponders are not visible on the item. Optical images (for example, digital photographs) of the item are then obtained while simultaneously measuring the positions of the RFID transponders. The optical images and measured positions of the RFID transponders may form the training data set for the ML model. For example, the RFID transponders positions may be used to label the optical images, which creates a set of labelled data for training the ML model. The ML model may then be trained to predict the measured position of each RFID transponder at a point in time based on the optical images captured at that point in time. After training, the ML model can process optical images of that item and similar items (for example, items of the same product) to detect and localize points on the item that correspond to the points where the RFID transponders were incorporated. In other examples, inertial data from gyroscopes in a real-world item, acceleration data from accelerometers in a real-world item and/or manual labelling of optical images could also or instead be used to create a training data set for an ML model.

The 3D model distorter 814 employs and/or implements one or more algorithms (possibly in the form of software instructions executable by the processor 804) to distort a 3D model based on the relative positions of multiple points on a corresponding real-world item. The shape of the resulting distorted 3D model may substantially match the shape of the real-world item. By way of example, the 3D model distorter 814 may distort a 3D model corresponding to the real-world item 850 based on the relative positions of the points 852. This 3D model may be obtained from the 3D model record 810, and the relative positions of the points may be determined by the image analyzer 812 using measurements from the sensor 840.

In some implementations, the 3D model distorter 814 maps or otherwise repositions points of a 3D model based on measured positions of points on a real-world item. Polygonal modeling, curve modeling and/or digital sculpting may then be used by the 3D model distorter 814 to form a distorted 3D model based on the repositioned points. In this way, a shape of the distorted 3D model may correspond to a shape of the real-world item.

The AR content generator 816 employs and/or implements one or more algorithms (possibly in the form of software instructions executable by the processor 804) to generate AR content for one or more users. This AR content can provide the users with an AR experience.

To generate AR content, possible inputs to the AR content generator 816 might include:

- One or more 3D models. The 3D models may be obtained from the 3D model record 810, for example.
- One or more distorted 3D models. The 3D models may be obtained from the 3D model distorter 814, for example.
- A representation of a real-world space associated with a user. The representation of the real-world space may be obtained using a SLAM process and/or the image analyzer 812. The representation of the real-world space may be defined within a virtual coordinate system.
- A position of a user and/or user device within the real-world space, determined using a SLAM process and/or the image analyzer 812, for example.
- A position of one or more real-world items within the real-world space, determined using a SLAM process and/or the image analyzer 812, for example.
- Positions of multiple points on a real-world item within the real-world space, determined using the image analyzer 812 and/or through analysis of radio wave, inertial and/or magnetic measurements, for example.

The AR content output by the AR content generator 816 can include visual, haptic and/or audio content. This visual, haptic and/or audio content may be generated based on the relative position (including a location and orientation) of a user and/or a user device within a real-world space. In this way, the AR content may virtually alter the user's perception of the real-world space in a contextually relevant manner.

Visual content can allow a user to view virtual patterns, graphics and/or objects within an AR experience. In some implementations, visual content may be overlaid onto a real-world space surrounding a user. This can include compositing the visual content with an image of the real-world space captured by a camera, for example. Alternatively, the visual content can be overlaid onto the real-world space using a transparent display in an AR headset, for example. In some implementations, AR content includes a render of a 3D model that is overlaid on a real-world item to change the physical appearance of the item. This may allow multiple visual variants of a product to be viewed on the same real-world item.

Haptic content can allow a user to touch and feel virtual textures within an AR experience. Haptic content may alter the textures of a real-world item. In commerce applications, this may allow a user to interact with a blank item of a product and feel the textures of one or more other variants of the product. Haptic content might be implemented, at least in part, using clothing with built-in haptics.

Audio content can allow a user to hear sounds within an AR experience. Audio content may implement spatial audio with a directionality corresponding to the position of a user relative to a source of the audio content within an AR experience. In some implementations, spatial audio is produced by independently controlling the sounds played into each ear of a user.

AR content can be continuously or intermittently updated by the AR content generator 816 to reflect changes and/or modifications in an AR experience. For example, if a 3D model is being used to alter the appearance of a real-world item and the user moves relative to a real-world item, then new AR content may be generated to reflect the new position of the user relative to the real-world item. The new AR content may include a new render of the 3D model that is based on the new position of the user relative to the real-world item. Further, if the real-world item is deformable and changes shape over time, then new AR content may be generated using a 3D model that is distorted based on the real-time shape of the real-world item.

Although the image analyzer 812, the 3D model distorter 814 and the AR content generator 816 are illustrated as being stored separately in the memory 806, this is only an example. Some embodiments could combine the functionality of the image analyzer 812, the 3D model distorter 814 and/or the AR content generator 816 in a single software instance stored in the memory 806 or in another computer readable medium.

AR content that is generated by the AR engine 802 may be output for presentation at the user device 830. For example, AR content may be displayed on the user interface 836. As such, the user device 830 may enable a user to engage with an AR experience provided by the AR engine 802. In FIG. 5, one user device is shown by way of example. However, more than one user device may be in communication with the AR engine 802 and/or receive AR content from the AR engine.

The AR engine 802 is provided by way of example. Other implementations of an AR engine are also contemplated. In some implementations, an AR engine is provided at least in part by an e-commerce platform, either as a core function of the e-commerce platform or as an application or service supported by or communicating with the e-commerce platform. In some implementations, an AR engine is implemented as a stand-alone service to generate AR content. While the AR engine 802 is shown as a single component, an AR engine could instead be provided by multiple different components that are in communication via a network.

In some implementations, the user device 830 has AR content generation capabilities. For example, an AR engine similar to the AR engine 802 could be implemented in part or in whole on the user device 830. A software application or instance may be installed on the user device 830 that generates AR content locally (i.e., on the user device 830). The software application may receive at least some of the 3D model record 810, the image analyzer 812, the 3D model distorter 814 and/or the AR content generator 816 from the AR engine 802.

Figure 9:
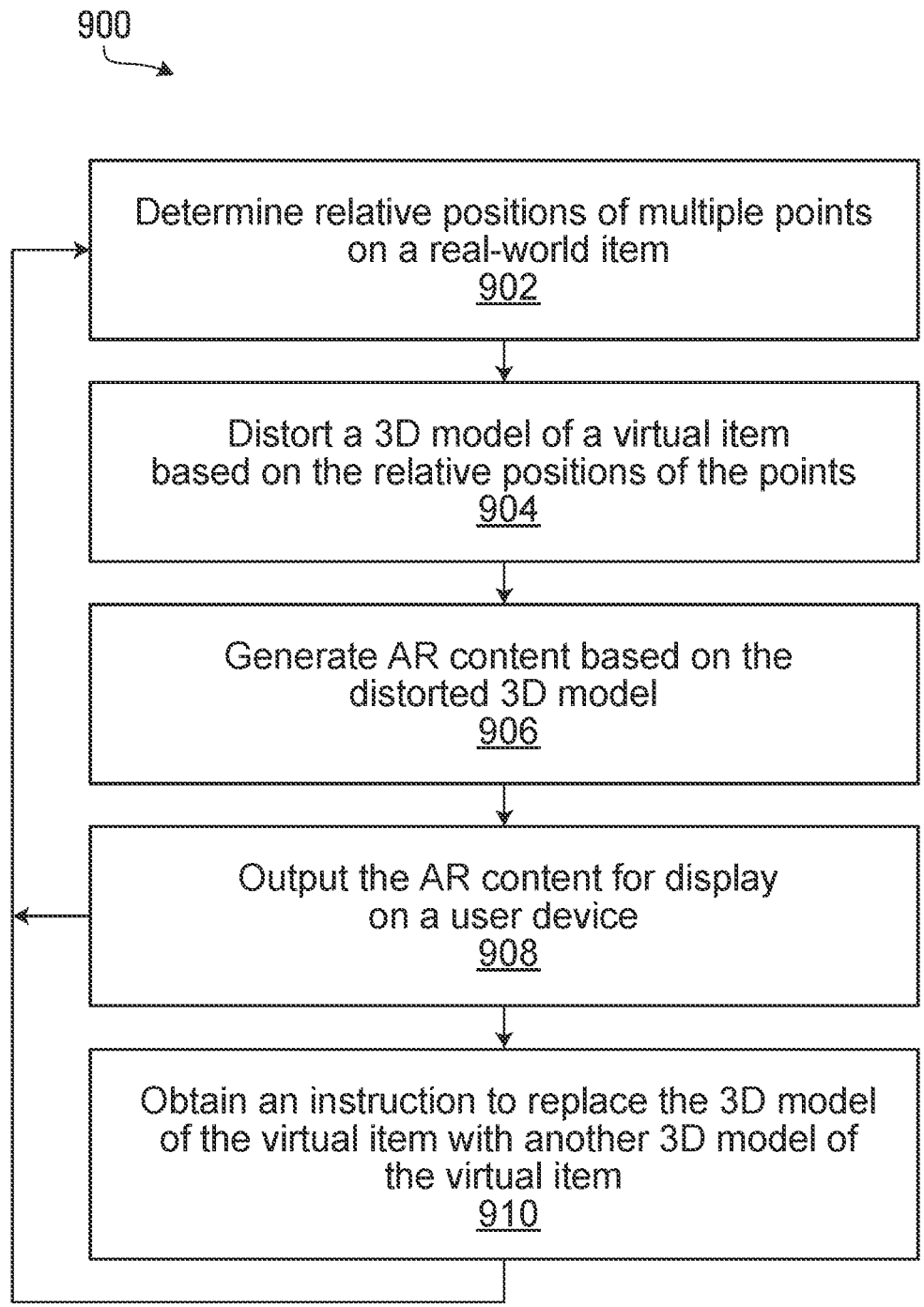
FIG. 9 is a flow diagram illustrating a method for generating AR content using a distorted 3D model, according to an embodiment.

Referring now to FIG. 9, shown is a flow diagram illustrating a method 900 for generating AR content using a distorted 3D model, according to an embodiment. The method 900 will be described as being performed by the AR engine 802 of FIG. 8 to virtually alter the real-world item 850. However, at least a portion of the method 900 could instead be performed elsewhere, such as at the user device 830, for example. Moreover, while the method 900 is described above in relation to the real-world item 850, the method 900 may be more generally applied to virtually alter any items and/or any portions of items. These items may be deformable items, non-limiting examples of which include clothing, shoes and furniture.

Step 902 includes the processor 804 determining the relative positions of multiple points on the real-world item 850. These points may include, but are in no way limited to, the points 852. The relative positions of multiple points on the real-world item 850 may indicate or provide the approximate shape of the real-world item 850 (or at least a portion of the real-world item 850) at an instance in time and may be stored in the memory 806 following step 902.

In some implementations, the determined positions of the points on the real-world item 850 are defined within a virtual coordinate system of an AR experience. For example, a SLAM process might be used to map a virtual coordinate system to a real-world space surrounding the real-world item 850. The positions of multiple points on the real-world item 850 may then be defined as coordinates within the virtual coordinate system. The position of a user and/or the user device 830 may also be defined within the virtual coordinate system.

It should be noted that a determined position of a point on a real-world item can include a location and an orientation. For example, a point on a surface of the real-world item 850 could be defined by the location of the point on the surface (such as a coordinate of the point in a virtual coordinate system, for example) and a normal vector to the surface at the point.

In some implementations, step 902 includes obtaining measurements of the real-world item 850, optionally using the sensor 840. Non-limiting examples of such measurements include optical measurements, radio wave measurements, inertial measurements and/or magnetic measurements. The measurements may be analysed by the processor 832 of the user device 830 to determine the relative positions of multiple points on the real-world item 850. The relative positions of the points may then be transmitted to the AR engine 802. Alternatively, or in addition, the measurements may be transmitted from the user device 830 to the AR engine 802 for analysis by the processor 804. For example, optical images may be input into the image analyzer 812 to determine the relative positions of multiple points on the real-world item 850.

In some implementations, an ML model is used in step 902 to help determine the relative positions of multiple points on the real-world item 850. As discussed in further detail elsewhere herein, an ML model may be trained to detect and localize points on the real-world item 850 using optical measurements and/or other measurements of the real-world item 850. Step 902 may include inputting these measurements into the ML model and obtaining an output of the ML model. The relative positions of the points on the real-world item 850 may then be determined based on the output of the ML model. This ML model may be implemented by the image analyzer 812, for example.

As noted above, markers may be implemented at multiple points on the real-world item 850. Step 902 may include determining the relative positions of each marker, which can then be used as the position of a respective point on the real-world item 850. In some implementations, the markers may be or include optical markers. In these implementations, step 902 may include obtaining one or more images of the real-world item 850 from the sensor 840, for example, and performing image analysis on the images (using the image analyzer 812, for example) to detect and/or localize the markers.

Some portions of the real-world item 850 might not be detectable through measurements in certain situations. For example, when the real-world item 850 is a deformable item such as a garment, flowing or folding of the real-world item 850 may cause some portions to be visually occluded. The non-detection of a portion of the real-world item 850 may be construed by the AR engine 802 as a fold or crease in a surface of the real-world item 850. By way of example, when the real-world item 850 includes QR codes and some of the QR codes are not detectable through optical measurements, the positions of the occluded QR codes may be designated as one or more folds. Alternatively or additionally, the non-detection of a portion of the real-world item 850 may be construed by the AR engine 802 as another object blocking that portion of the real-world item 850. The detection of shadows on the real-world item 850 through image analysis, for example, is another potential method for determining the positions of folds or creases in the real-world item 850.

The detection of folds or creases in the real-world item 850 is distinct from the use of motion-capture suits, for example. Motion-capture suits have markers at defined control points and are configured to inhibit those markers shifting and becoming unnecessarily occluded by making the suit skin-tight. The skin-tight nature of a motion-capture suit may deliberately reduce folding of the suit. In contrast, many products such as garments, for example, are prone to folding and may even be designed to fold.

Step 904 includes the processor 804 distorting a 3D model of a virtual item based on the relative positions of multiple points on the real-world item 850 determined in step 902. The 3D model of the virtual item may correspond to the real-world item 850. For example, the 3D model may have been generated to represent the real-world item 850 and may have even been generated based on a 3D scan of the real-world item 850 or a similar item (for example, an item of the same product sold by a merchant). However, the 3D model may represent only a portion of the real-world item 850, rather than the entire real-world item 850.

In some implementations, step 904 includes modifying the 3D model to reposition points in the 3D model to be in relative positions corresponding to the relative positions of the points determined in step 902. Polygonal modeling, curve modeling and/or digital sculpting may then be used to connect the repositioned points and form a distorted 3D model. As a result, the shape of the distorted 3D model may substantially match the shape of the real-world item 850.

In some implementations, step 904 includes inputting the 3D model and/or the relative positions of the multiple points of the real-world item 850 into the 3D model distorter 814. The distorted 3D model of the virtual item may be obtained from an output from the 3D model distorter 814.

The distorted 3D model generated at step 904 may be used to alter a user's perception of the real-world item 850. In some implementations, the 3D model includes a visual appearance for the real-world item 850. The 3D model may also or instead include a virtual sound and/or texture for the real-world item 850. The visual appearance, sound and/or texture may simulate a certain variant of the real-world item 850. For example, when the real-world item 850 corresponds to a particular product sold by a merchant, then the 3D model may simulate a particular variant of that product.

The 3D model that is distorted in step 904 may be obtained from the 3D model record 810. Selecting a specific 3D model from the 3D model record 810 may be performed in any of a number of different ways. In some cases, the 3D model may be actively selected from a set of 3D models via user input at the user device 830, for example. The selected 3D model may correspond to a particular variant of the real-world item 850 that a user wishes to virtually interact with, for example.

In some implementations, the 3D model that is distorted in step 904 may be automatically selected or suggested by a computer platform. For example, the AR engine 802 may suggest one or more 3D models for the user of the user device 830. The user may then select one of the suggested 3D models via input at the user interface 836.

Automatically selecting or suggesting a 3D model for the real-world item 850 may involve the use of some information regarding the real-world item 850, such as the product or product type corresponding to the real-world item 850 and/or an identity of a merchant that sells the real-world item 850, for example. The product, the product type and/or the identity of the merchant may be provided by a user through user input at the user device 830. Alternatively, or in addition, measurements of the real-world item 850 may be used to automatically identify the product, product type and/or merchant corresponding to the real-world item 850.

According to one example, a particular arrangement of markers on the real-world item 850 might correspond to a certain product sold by a merchant. Through analysis of the relative positions of the markers, possibly using an ML model, the processor 804 may obtain a product number for the product and/or an identity of the merchant that sells the product. According to another example, QR codes on the real-world item 850 may encode information to help identify the product number and/or the merchant. After obtaining the product number and/or the identity of the merchant, the AR engine 802 may select or suggest 3D models for the real-world item 850. These 3D models may have been generated for the specific purpose of altering the appearance of that product sold by the merchant.

User preferences may also or instead be used to help automatically select or suggest a 3D model for the real-world item 850. For example, once the product and/or the merchant corresponding to the real-world item 850 are identified, a list of 3D models corresponding to that product and/or merchant may be obtained from the 3D model record 810. User preferences may then be used by the AR engine 802 to select a subset of 3D models from this list. In one example, if the user of the user device 830 has historically purchased yellow products that are similar to the real-world item 850, then a 3D model selected or suggested for the user might provide a yellow variant of the real-world item 850. In another example, if other users typically purchase and/or view a particular variant of the real-world item 850 (i.e., that variant is popular with customers), then a 3D model corresponding to that variant may be selected or suggested by the AR engine 802 for the user of the user device 830.

A record of user preferences may be stored by the AR engine 802 to help automatically select or suggest a 3D model for the user, but this might not always be the case. A record of user preferences can also be stored elsewhere and be accessed by the AR engine 802. A record of user preferences may be stored in the form of a look-up table, for example.

In some implementations, an ML model, optionally provided by the AR engine 802, is trained to predict a user's preferences based on the user's past purchases, on other user's preferences and/or on other user activity. A record of user preferences may form at least a portion of a training data set for such an ML model. The trained ML model may then be implemented to suggest or select a 3D model for the real-world item 850 that matches the preferences of the user associated with the user device 830.

Step 906 includes the processor 804 generating AR content for presentation at the user device 830 or elsewhere. The AR content generated at step 906 may be based on the distorted 3D model generated at step 904. For example, step 906 may include rendering the distorted 3D model. The AR content may use the render to overlay the real-world item 850 and virtually alter the appearance of the real-world item 850. FIGS. 6 to 7 provide examples of overlaying AR content onto a real-world item to alter the appearance of the real-world item. The AR content generated at step 906 may also or instead provide sounds and/or textures that alter the real-world item 850.

In some implementations, the AR content generated at step 906 is based on a combination of the distorted 3D model and image processing techniques such as chroma key compositing, for example. Consider a case in which the AR content is generated to depict a variant of the real-world item 850 that is a uniform color and has a logo at one location. Chroma key compositing could be used to virtually add the uniform color to the real-world item 850. The distorted 3D model might only represent the logo, and a render of the 3D model may be used to provide a depiction of the logo that is based on the shape of the real-world item 850. This may save computing resources at the AR engine 802, as only a 3D model of the logo (or a portion of the real-world item 850 corresponding to the logo) is distorted and rendered, rather than a 3D model of the entire real-world item 850.

In optional step 908, the AR content generated in step 906 is output by the processor 804 for display on the user device 830. The form of the AR content is not limited herein. If the sensor 840 of the user device 830 includes a camera, then the AR content may include a render of the distorted 3D model composited with an image (or a frame of a video) of the real-world item 850 captured by the camera. The render may overlay the depiction of the real-world item 850 on the image to alter the appearance of the real-world item 850.

In some implementations, the distorted 3D model is rendered from a viewpoint or perspective corresponding to the image of the real-world item 850, such that the render substantially matches the size and orientation of the real-world item 850 in the image. Image analysis (using the image analyzer 812, for example) may be used to determine the viewpoint corresponding to the image. The same image captured by the sensor 840 may also be used in step 902 to determine the relative positions of points on the real-world item 850.

If the user device 830 is a device with a transparent display, then the render of the distorted 3D model may be overlaid on a user's view of the real-world item 850 through the transparent display. Here, the distorted 3D model may be rendered based on a position of the user device 830 and/or the user relative to the real-world item 850, in order to accurately reflect the size and orientation of the real-world item 850 from the perspective of the user. The method 900 may further include determining this position of the user and/or the user device 830 relative to the real-world item 850. For example, measurements captured by the sensor 840 could be analysed to determine the position, viewpoint and/or perspective of the user device 830 and/or the user relative to the real-world item 850, optionally using a SLAM process.

Steps 902, 904, 906, 908 may be repeated multiple times to provide updated AR content that reflects movement of the user and/or the user device 830 relative to the real-world item 850 over time. The updated AR content may also or instead reflect changes to the shape of the real-world item 850. For example, the real-world item 850 could be a garment with flexible surfaces, allowing the real-world item 850 to change shape. Intermittently or continuously performing steps 902, 904, 906, 908 may track the varying shape of the real-world item 850, distort a 3D model based on the varying shape, and generate AR content to alter the appearance of the real-world item 850 in a manner that reflects its varying shape.

According to one example, the real-world item 850 begins in a first shape. A first instance of step 902 is performed to determine first relative positions of multiple points on the real-world item 850 in this first shape, which may allow the first shape to be determined by the AR engine 802. In a first instance of step 904, a 3D model is distorted based on the first relative positions of the multiple points to generate a first distorted 3D model that reflects the first shape. First AR content is then generated at step 906 based on the first distorted model. At a later time, the real-world item 850 may be in a second shape. A second instance of step 902 is performed to determine second relative positions of the multiple points on the real-world item 850 in the second shape, thereby potentially determining the second shape. Second instances of steps 904, 906 can then generate second AR content based on a second distorted 3D model, where the second distorted 3D model may be produced by distorting the first distorted 3D model or distorting the original 3D model based on the second relative positions of the points on the real-world item 850.

Optional step 910 includes the processor 804 obtaining an instruction to replace the 3D model of the virtual item distorted in step 904 (referred to as the first 3D model) with a second 3D model of the virtual item. This instruction may originate from user input at the user device 830. For example, the first 3D model may correspond to one variant of the real-world item 850, but the user of the user device 830 might wish to view a different variant of the real-world item 850. Using the user device 830, the user may generate an instruction to view the different variant via AR content, which is interpreted by the AR engine 802 as an instruction to replace the first 3D model with a second 3D model. Steps 902, 904, 906, 908 may then be repeated to generate further AR content based on a distorted version of the second 3D model.

The method 900 may be implemented in commerce applications to allow merchants to avoid storing multiple different variants of products in a retail store, thereby allowing relatively small stores to provide customers with a wide variety of product variants. The method 900 may also be applied beyond the commerce context. For example:

- The method 900 may be applied to allow a participant in a video chat to virtually alter their clothing. An article of clothing won by the participant may include markers to help determine the shape of the clothing.
- The method 900 may be applied to virtually alter the clothing on players in sporting events. For example, the method 900 may be used to change the branding on a hockey sweater during a game and/or may be used to add a regional sponsor to a player's clothing during a broadcast.
- The method 900 may be applied to allow a user to place virtual elements on clothing. Non-limiting examples of such elements include information about appointments, a clock, information about the weather and an indication of the wearer's mood. These elements may be viewed using a headset with a transparent display, and the elements may flow with the clothing as the wearer moves.

Further Examples of Generating AR Content to Virtually Alter a Real-World Item

FIGS. 10 to 18 provide examples of AR content that is generated to virtually alter a deformable, real-world item using distorted 3D models.

Figure 10:
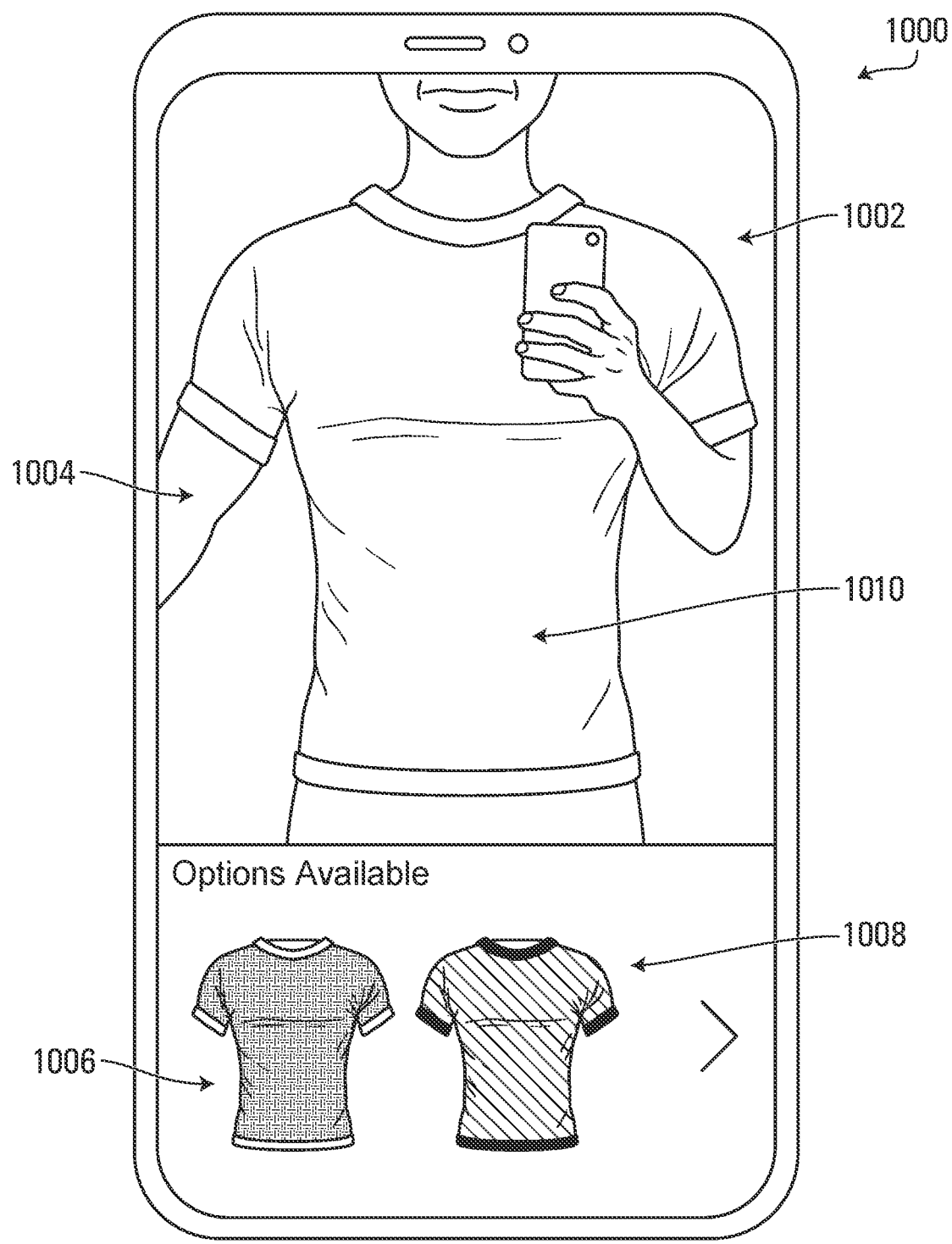
FIG. 10 illustrates a user device displaying a screen page, according to an embodiment.

FIG. 10 illustrates a user device 1000 displaying a screen page 1002, according to an embodiment. The screen page 1002 includes an image 1004 of a user standing in front of a mirror wearing a shirt 1010. In the illustrated example, the image 1004 is captured by a camera on the user device 1000.

In some implementations, the image 1004 is captured within a retail store where the user is trying on the shirt 1010. Alternatively, the shirt 1010 may have been mailed to the user and the user might be trying on the shirt 1010 within their home.

The shirt 1010 is one variant of a deformable, real-world product sold by a merchant and might even be considered a blank item of that product. However, in some cases, the user might be interested in viewing different variants of the product. These variants of the product might not be physically available in the retail store or may not have been mailed to the user, and therefore the user might not be able to physically try on the different variants.

To allow the user to virtually interact with different variants of the shirt 1010 via the user device 1000, the screen page 1002 includes multiple options 1006, 1008. As illustrated, each of the options 1006, 1008 corresponds to a different pattern for the shirt 1010. These patterns depict different variants of the shirt 1010. Selecting one of the options 1006, 1008 may result in the method 900 of FIG. 9 being implemented to generate AR content that adds the corresponding pattern to the shirt 1010. In this way, the method 900 may allow the user to view multiple different variants of the shirt 1010 without having to try on different real-world items.

In some implementations, the options 1006, 1008 are provided based on product suggestions that have been automatically generated by an AR engine. The AR engine may determine the product number for the shirt 1010 and/or the identity of the merchant that sells the shirt 1010 through analysis of the image 1004, for example. Using the product number and/or the identity of the merchant, the AR engine may obtain 3D models that provide the patterns corresponding to the options 1006, 1008. These 3D models may be all of the 3D models that are associated with the product number and/or the merchant, or they may be a subset of the total available 3D models. As outlined in further detail above, this subset may be selected based on user preferences.

Figure 11:
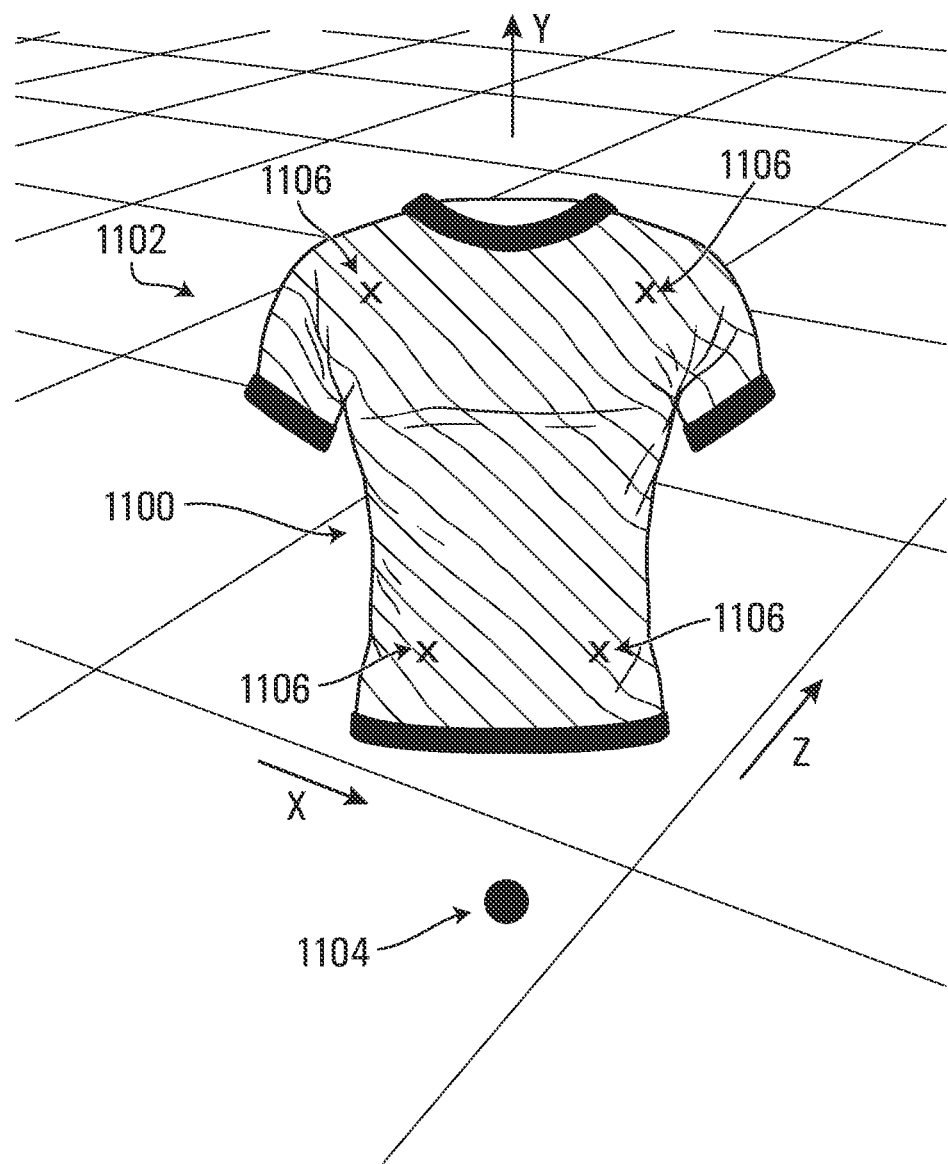
FIG. 11 illustrates a distorted 3D model, defined within a virtual coordinate system, generated in response to user selection of an option in the screen page of FIG. 10.

FIG. 11 illustrates a distorted 3D model 1100 generated in response to user selection of the option 1008 in the screen page 1002. The distorted 3D model 1100 provides the pattern for the shirt 1010 shown in the option 1008 and is defined at the origin of a virtual coordinate system 1102. A position 1104 of the user device 1000 is also defined within the virtual coordinate system 1102. This position 1104 corresponds to the relative position of the shirt 1010 in the image 1004. In other words, the distance between the distorted 3D model 1100 and the position 1104 in the virtual coordinate system 1102 is approximately equal to the real-world distance from the user device 1000 to the mirror plus the distance from the shirt 1010 to the mirror. The position 1104 may have been determined through analysis of the image 1004 and/or through analysis of other measurements.

The distorted 3D model 1100 includes multiple points 1106 defined within the virtual coordinate system 1102. The relative positions of the points 1106 correspond to relative positions of multiple points on the shirt 1010, which may have been determined in step 902 of the method 900. For example, the image 1004 and/or other measurements may have been analysed to determine the relative positions of the points on the shirt 1010. Although not visible in the image 1004, the shirt 1010 might include markers to help determine the relative positions of the points.

The distorted 3D model 1100 may have been generated by repositioning the points 1106 to be in relative positions corresponding to the relative positions of the points on the shirt 1010, optionally in step 904 of the method 900. As a result, the shape of the distorted 3D model 1100 substantially matches the shape of the shirt 1010 shown in the image 1004. This is reflected in the outline, folds and creases of the distorted 3D model 1100, for example. Moreover, the pattern provided by the distorted 3D model 1100 is deformed to correspond to the shape of the shirt 1010. As such, the distorted 3D model 1100 may be used to alter the appearance of the shirt 1010 in a realistic manner.

Figure 12:
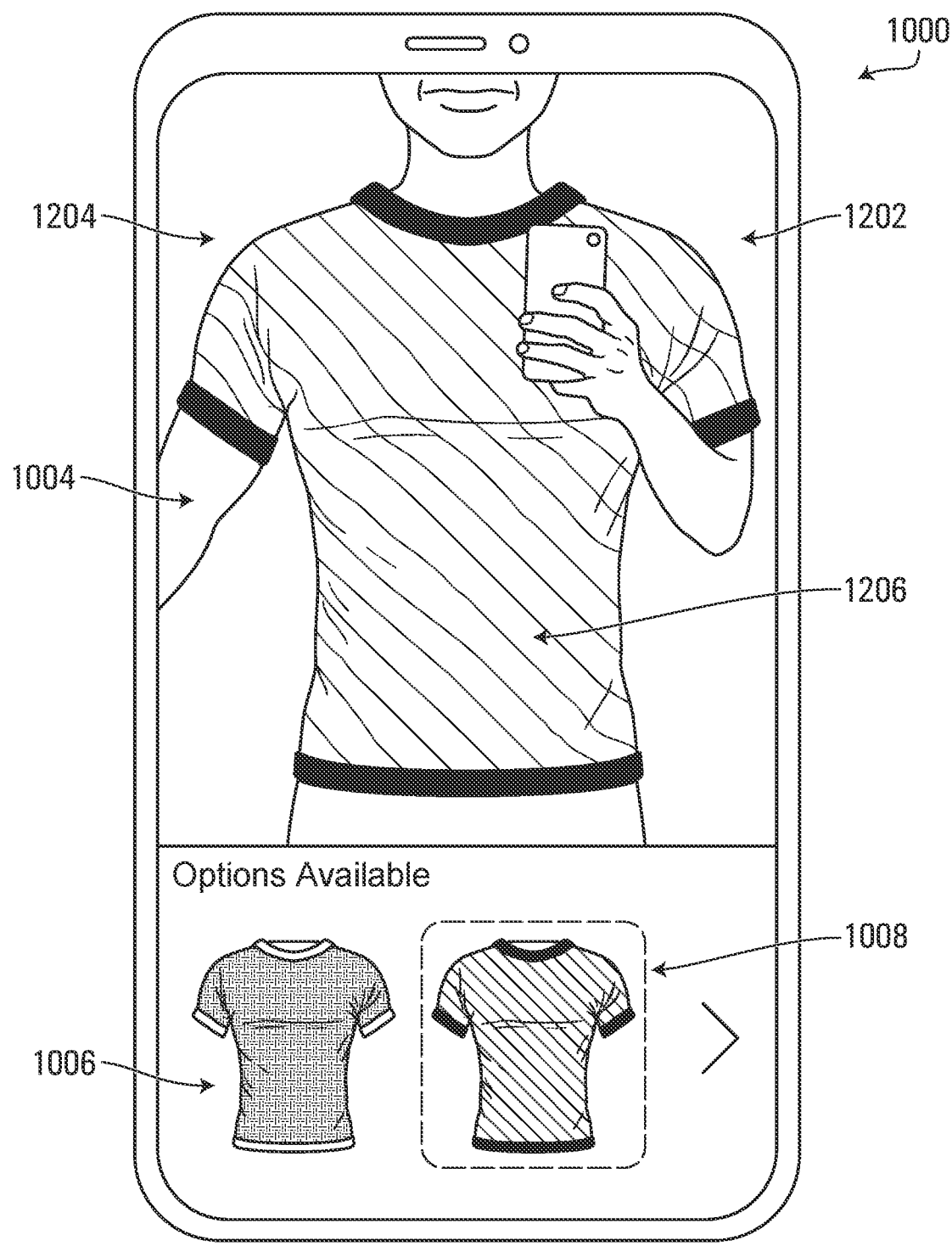
FIG. 12 illustrates the user device of FIG. 10 displaying a screen page including AR content based on the distorted 3D model of FIG. 11.

FIG. 12 illustrates the user device 1000 displaying a screen page 1202 generated in response to user selection of the option 1008 in the screen page 1002. The screen page 1202 includes AR content 1204 comprising a render 1206 of the distorted 3D model 1100. The AR content 1204 may be generated in step 906 of the method 900, for example. The render 1206 is generated based on the position 1104 of the user device 1000 in the virtual coordinate system 1102 relative to the distorted 3D model 1100, such that the size and the orientation of the render 1206 in the AR content 1204 corresponds to the size and the orientation of the shirt 1010 in the image 1004.

In the AR content 1204, the render 1206 is overlaid with the image 1004 such that the render 1206 alters the appearance of the shirt 1010. The altered appearance of the shirt 1010 includes the pattern provided by the distorted 3D model 1100. The render 1206 accounts for the folds and creases in the shirt 1010, and therefore the pattern is realistically reflected in these folds and creases. In this way, the user of the user device 1000 is able to virtually view the pattern provided by the distorted 3D model 1100 on the shirt 1010.

AR content may be continuously or intermittently updated for the user device 1000 in real-time, which may reflect the movement of the user and/or the user device 1000 relative to the shirt 1010 in the real-world. Notably, in such a real-time/near-real-time implementation, AR content may be continuously or intermittently updated based on captured images of the shirt 1010 in the real-world. As such, in at least some such implementations, real-world images of the shirt 1010 may be captured in sequence and then briefly buffered, such as by storing some or all of the captured images in a buffer in memory, in order to facilitate the generation of the AR content based on those buffered images. More broadly, in some implementations, captured images of the shirt 1010 in the real-world may, additionally or alternatively, be stored (for example, in memory, in a buffer or in persistent storage) for a longer period than the time required for generation of real-time/near-real-time AR content. Conveniently then, content akin to the AR content could be generated based on such stored images at some later time.

Figure 13:
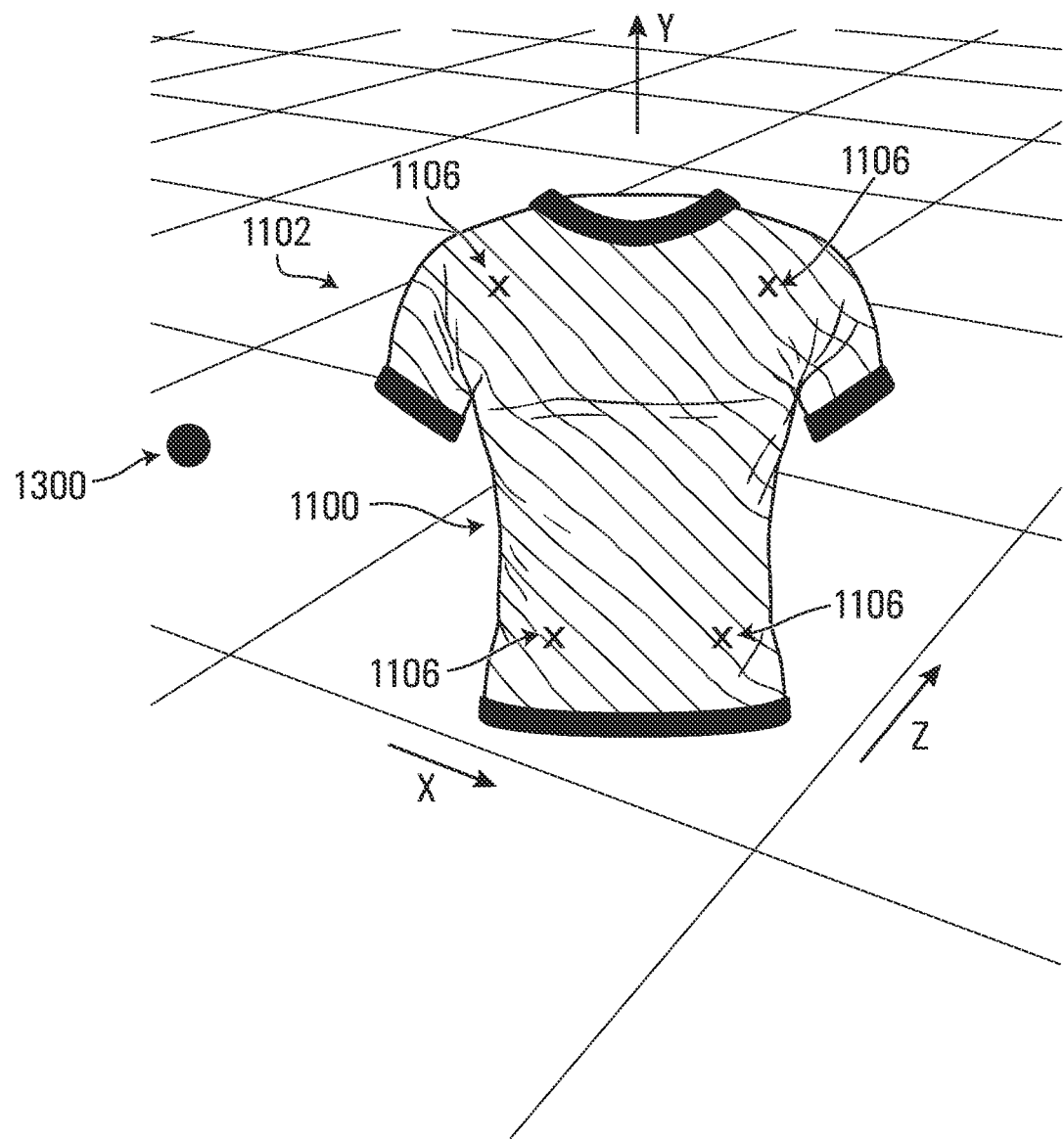
FIG. 13 illustrates the distorted 3D model of FIG. 11 and a new position of the user device of FIG. 10 within the virtual coordinate system of FIG. 11.

FIG. 13 illustrates the distorted 3D model 1100 of FIG. 11 and a new position 1300 of the user device 1000 within the virtual coordinate system 1102. The new position 1300 may reflect a new position (including a new location and orientation) of the user device 1000 relative to the shirt 1010 in the real-world. For example, the position 1300 may be the result of the user rotating the shirt 1010 relative to the user device 1000 in the real-world, such that the user device 1000 is imaging the right-side of the shirt 1010.

Figure 14:
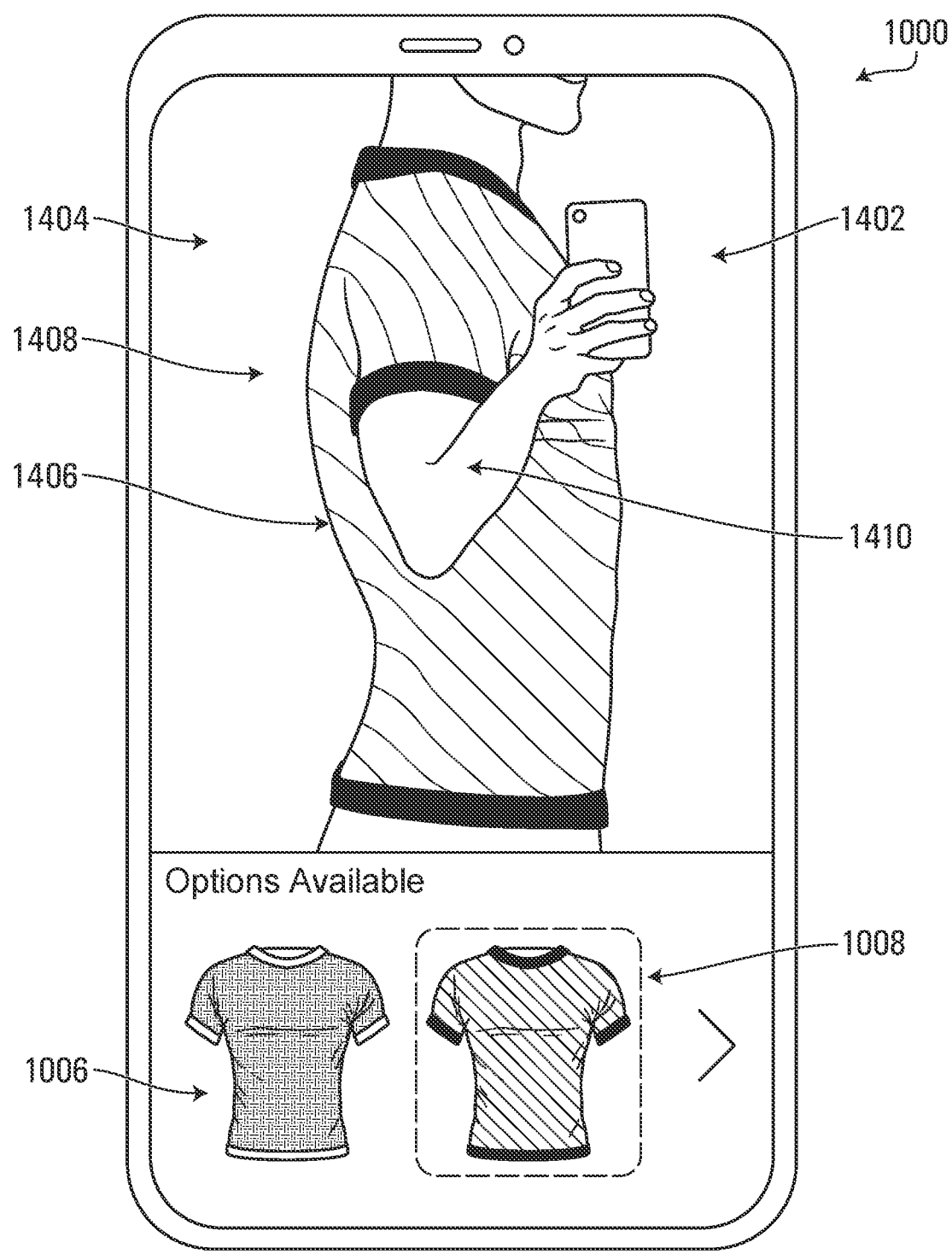
FIG. 14 illustrates the user device of FIG. 10 displaying a screen page including updated AR content based on the new position of the user device within the virtual coordinate system shown in FIG. 13.

FIG. 14 illustrates the user device 1000 displaying a screen page 1402 including updated AR content 1404 that is based on the position 1300 of the user device 1000 within the virtual coordinate system 1102. The AR content 1404 includes an image 1408 showing the right-side of the user wearing the shirt 1010. The AR content 1404 further includes an updated render 1406 of the distorted 3D model 1100, which is based on the position 1300 of the user device 1000 relative to the distorted 3D model 1100 in the virtual coordinate system 1102. The render 1406 depicts the right-side of the distorted 3D model 1100 and substantially matches the size and orientation of the shirt 1010 from the viewpoint of the image 1408. The render 1406 is composited with the image 1408 to overlay the shirt 1010 in the AR content 1404, thereby virtually altering the appearance of the shirt 1010.

The render 1406 accounts for portions of the shirt 1010 that are occluded in the image 1408. For example, the arm of the user, shown generally at 1410 in FIG. 14, occludes a portion of the shirt 1010. This occluded portion of the shirt 1010 may have been identified through analysis of the image 1408 in step 902 of the method 900, for example. The render 1406 of the distorted 3D model 1100 is generated to account for the occluded portion and does not overlap the arm 1410 of the user.

FIGS. 11 to 14 illustrate an example of how AR content generated using the method 900, for example, may accommodate movement of a real-world item relative to a user device in an AR experience.

In addition to reflecting movement of the user and/or the user device 1000 relative to the shirt 1010 in the real-world, updated AR content may also or instead reflect real-time deformation of the shirt 1010.

Figure 15:
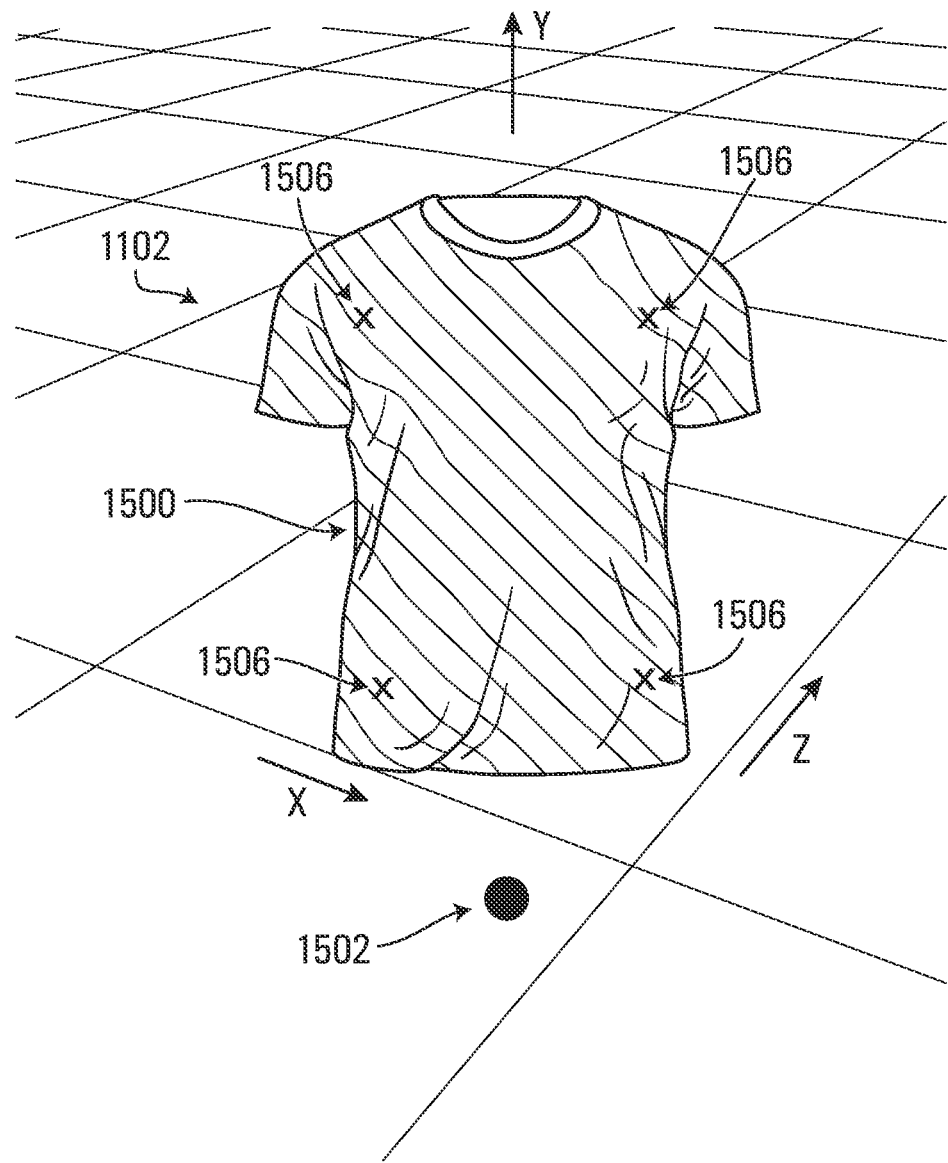
FIG. 15 illustrates another distorted 3D model defined within the virtual coordinate system of FIG. 11.

FIG. 15 illustrates another distorted 3D model 1500 defined within the virtual coordinate system 1102. A position 1502 of the user device 1000 is also defined within the virtual coordinate system 1102 in FIG. 15. The distorted 3D model 1500 provides the same pattern for the shirt 1010 as the distorted 3D model 1100. However, the distorted 3D model 1500 has been distorted differently than the distorted 3D model 1100, which is reflected in the differing shapes of the distorted 3D models 1100, 1500 shown in FIGS. 11 and 15. In some cases, the distorted 3D models 1100, 1500 are different distortions of the same original 3D model.

The distorted 3D model 1500 may have been generated in response to the shirt 1010 changing shape in the real-world. For example, the distorted 3D model 1100 might correspond to a first shape of the shirt 1010 measured at one instance in time, and the distorted 3D model 1500 might correspond to a second shape of the shirt 1010 measured at another instance in time. The distorted 3D model 1500 includes multiple points 1506 at relative positions that correspond to the relative positions of multiple points on the shirt 1010 in its second shape. The points 1506 might correspond to the points 1106 on the distorted 3D model 1100, but the points 1506 are at different relative positions than the points 1106 due to the different shapes of the distorted 3D models 1100, 1500.

Figure 16:
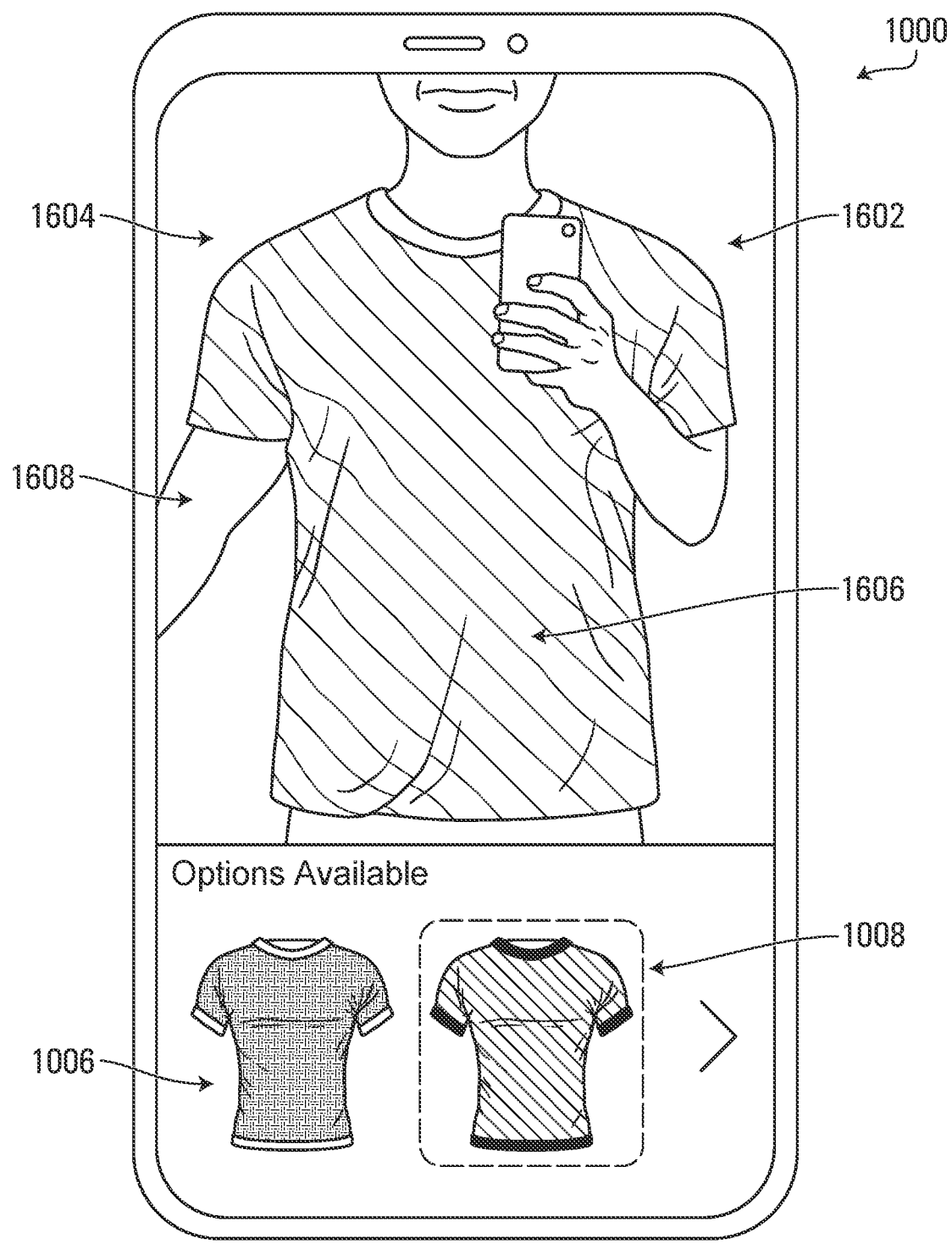
FIG. 16 illustrates the user device of FIG. 10 displaying a screen page including updated AR content based on the distorted 3D model of FIG. 15.

FIG. 16 illustrates the user device 1000 displaying a screen page 1602 including updated AR content 1604. The AR content 1604 includes an image 1608 of the shirt 1010 in its second shape. The AR content 1604 further includes a render 1606 of the distorted 3D model 1500 that is based on the position 1502 of the user device 1000 relative to the distorted 3D model 1500 in the virtual coordinate system 1102. The render 1606 is overlaid with the shirt 1010 in the AR content 1604 and provides a pattern that conforms to the second shape of the shirt 1010.

FIGS. 11, 12, 15 and 16 illustrate an example of how AR content generated using the method 900, for example, may accommodate real-time deformation of a real-world item.

The pattern provided by the distorted 3D models 1100, 1500 is only one example of a pattern that could be used to alter the appearance of the shirt 1010. In some implementations, multiple different 3D models for the shirt 1010 are available, where each 3D model provides a different pattern. The different patterns may correspond to different variants of the shirt 1010. By way of example, the option 1006 shown in the screen pages 1002, 1202, 1402, 1602 corresponds to a 3D model providing a different pattern for the shirt 1010 than the pattern provided by the distorted 3D models 1100, 1500. Selection of the option 1006 in any of the screen pages 1202, 1402, 1602 may generate an instruction to replace the distorted 3D model 1100 or the distorted 3D model 1500 with the 3D model providing this different pattern.

Figure 17:
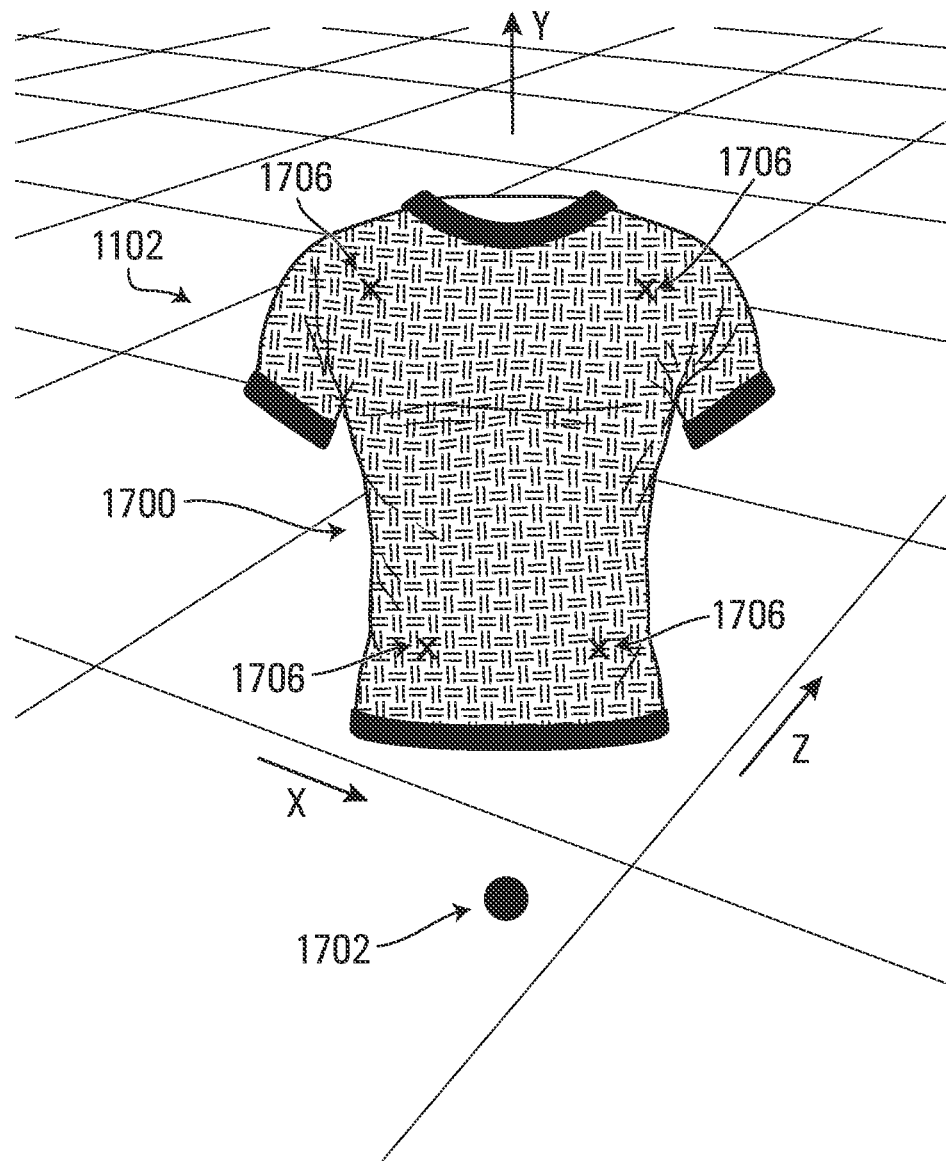
FIG. 17 illustrates a further distorted 3D model generated in response to user selection of an option in the screen page of FIG. 12.

FIG. 17 illustrates a distorted 3D model 1700 generated in response to selection of the option 1006 in the screen page 1202. The distorted 3D model is defined within the virtual coordinate system 1102. The relative positions of multiple points 1706 on the distorted 3D model 1700 correspond to measured relative positions of multiple points on the shirt 1010 after selection of the option 1006. Thus, the shape of the distorted 3D model 1700 generally corresponds to the shape of the shirt 1010 after selection of the option 1006. A position 1702 of the user device 1000 is also defined within the virtual coordinate system 1102 in FIG. 17.

Figure 18:
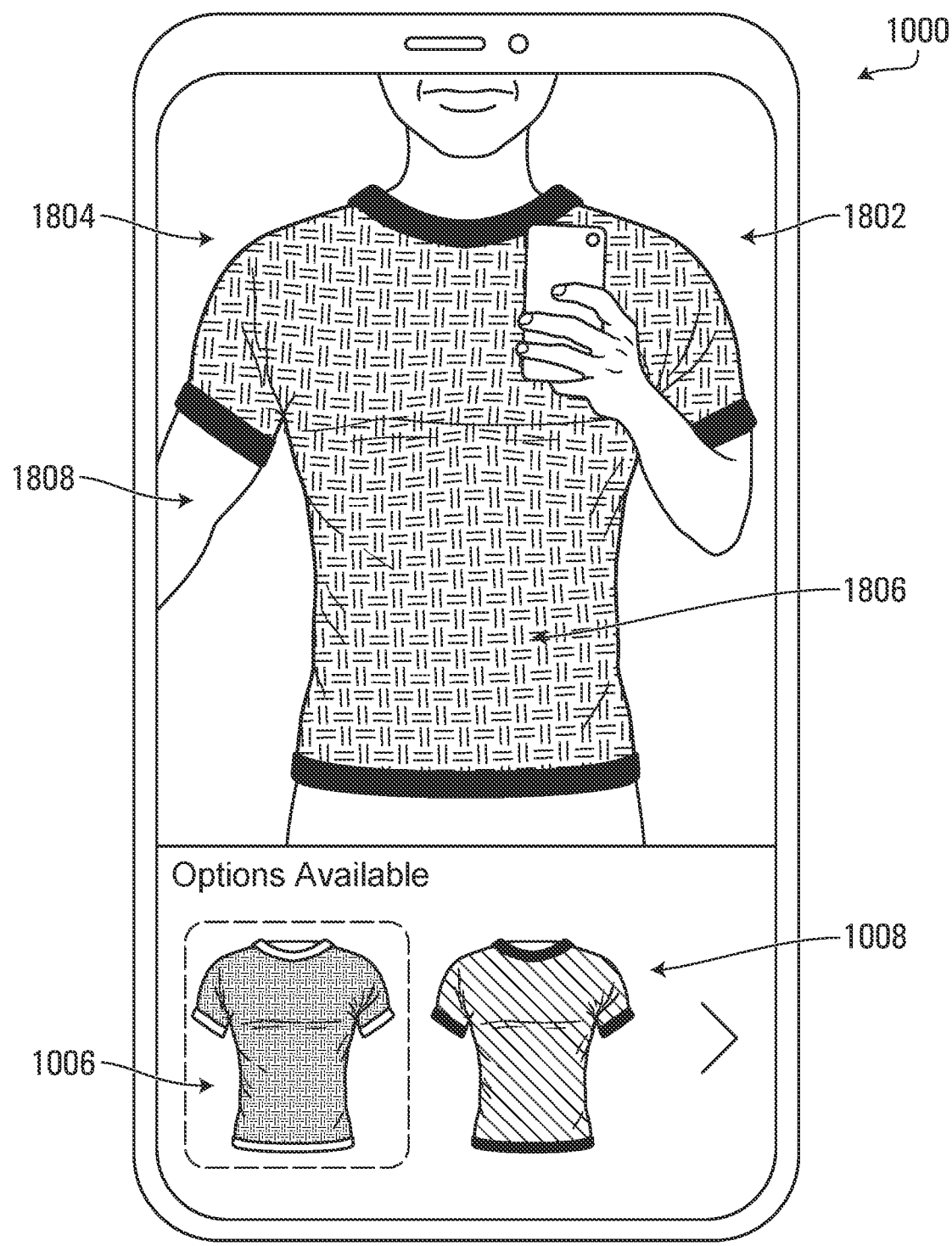
FIG. 18 illustrates the user device of FIG. 10 displaying a screen page including AR content based on the distorted 3D model of FIG. 17.

FIG. 18 illustrates the user device 1000 displaying a screen page 1802 generated in response to selection of the option 1006 in the screen page 1202. The screen page 1802 includes AR content 1804 with a render 1806 of the distorted 3D model 1700. In the AR content 1804, the render 1806 is overlaid with an image 1808 of the shirt 1010 such that the render 1806 adds the pattern provided by the distorted 3D model 1700 to the shirt 1010.

FIGS. 11, 12, 17 and 18 illustrate how AR content generated using the method 900, for example, may allow a user to virtually switch between multiple different variants of a real-world item in an AR experience.

The screen pages 1002, 1202, 1402, 1602, 1802 and the distorted 3D models 1100, 1500, 1700 may be generated by a software application executed on the user device 1000 or elsewhere. This software application may implement the method 900 of FIG. 9 or any other method disclosed herein. The software application may be an e-commerce application that enables the user to interact with multiple variants of the shirt 1010 using AR and also enables the user to purchase a variant of the shirt 1010. For example, any, one, some or all of the screen pages 1002, 1202, 1402, 1602, 1802 might include further options enabling the user to purchase a variant of the shirt 1010.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
   determining relative positions of a plurality of points on a real-world item, the relative positions of the plurality of points on the real-world item corresponding to a shape of the real-world item;
   modifying a three-dimensional model of a virtual item, the modifying including repositioning points on the three-dimensional model to be in relative positions corresponding to the relative positions of the plurality of points on the real-world item; and
   generating augmented reality (AR) content for presentation, the AR content being based on the modified three-dimensional model.

2. The computer-implemented method of claim 1, wherein the three-dimensional model of the virtual item yielded by the repositioning the points on the three-dimensional model has a shape corresponding to the shape of the real-world item.

3. The computer-implemented method of claim 1, wherein the virtual item provides a visual appearance for the real-world item in the AR content.

4. The computer-implemented method of claim 1, wherein the virtual item corresponds to the real-world item.

5. The computer-implemented method of claim 1, wherein generating the AR content includes rendering the modified three-dimensional model, and wherein:
   the modified three-dimensional model is rendered from a viewpoint corresponding to a captured image of the real-world item; and
   generating the AR content further includes compositing the rendering with the captured image to overlay the real-world item.

6. The computer-implemented method of claim 1, wherein generating the AR content includes rendering the modified three-dimensional model, the method further comprising:
determining a position of a user relative to the real-world item, wherein the modified three-dimensional model is rendered based on the position of the user.

7. The computer-implemented method of claim 1, wherein the real-world item includes a flexible surface.

8. The computer-implemented method of claim 1, wherein the real-world item is or includes a garment.

9. The computer-implemented method of claim 1, wherein:
the real-world item comprises a plurality of optical markers, each of the plurality of optical markers being at a respective different one of the plurality of points on the real-world item; and
determining the relative positions of the plurality of points on the real-world item comprises determining relative positions of the plurality of optical markers by performing image analysis on at least one image of the real-world item to detect the optical markers.

10. The computer-implemented method of claim 1, wherein:
the relative positions of the plurality of points are first relative positions of the plurality of points, the modified three-dimensional model of the virtual item is a first modified three-dimensional model of the virtual item, the shape is a first shape, and the AR content is first AR content; and
the method further comprises:
determining second relative positions of the plurality of points on the real-world item, the second relative positions corresponding to the real-world item in a second shape;
modifying the three-dimensional model of a virtual item to produce a second modified three-dimensional model, the modifying including repositioning points on the three-dimensional model to be in relative positions corresponding to the second relative positions of the plurality of points on the real-world item; and
generating second AR content for presentation, the second AR content being based on the second modified three-dimensional model.

11. The computer-implemented method of claim 1, wherein:
the relative positions of the plurality of points on the real-world item are based on measurements obtained from a device; and
the AR content is for presentation at that device.

12. The computer-implemented method of claim 1, wherein the three-dimensional model of the virtual item is a first three-dimensional model of the virtual item, the relative positions of the plurality of points are first relative positions of the plurality of points, and the AR content is first AR content, the method further comprising:
obtaining an instruction to replace the first three-dimensional model of the virtual item with a second three-dimensional model of the virtual item, the instruction originating from user input at a device;
determining second relative positions of the plurality of points on the real-world item, the second relative positions of the plurality of points on the real-world item corresponding to a second shape of the real-world item;
modifying the second three-dimensional model of a virtual item, the modifying including repositioning points on the second three-dimensional model to be in relative positions corresponding to the second relative positions of the plurality of points on the real-world item;
generating second AR content for presentation, the second AR content being based on the modified second three-dimensional model.

13. A system comprising:
memory to store relative positions of a plurality of points on a real-world item, the relative positions of the plurality of points on the real-world item corresponding to a shape of the real-world item; and
at least one processor to:
modify a three-dimensional model of a virtual item, the modifying including repositioning points on the three-dimensional model to be in relative positions corresponding to the relative positions of the plurality of points on the real-world item; and
generate augmented reality (AR) content for presentation, the AR content being based on the modified three-dimensional model.

14. The system of claim 13, wherein the three-dimensional model of the virtual item yielded by the repositioning the points on the three-dimensional model has a shape corresponding to the shape of the real-world item.

15. The system of claim 13, wherein the virtual item provides a visual appearance for the real-world item in the AR content.

16. The system of claim 13, wherein the virtual item corresponds to the real-world item.

17. The system of claim 13, wherein:
the at least one processor is further to render the modified three-dimensional model;
the modified three-dimensional model is rendered from a viewpoint corresponding to a captured image of the real-world item; and
the AR content includes the render composited with the captured image to overlay the real-world item.

18. The system of claim 13, wherein:
the relative positions of the plurality of points are first relative positions of the plurality of points, the modified model of the virtual item is a first modified model of the virtual item, and the AR content is first AR content;
the first relative positions of the plurality of points correspond to the real-world item in a first shape;
the memory is further to store second relative positions of the plurality of points on the real-world item, the second relative positions corresponding to the real-world item in a second shape; and
the at least one processor is further to:
modify the three-dimensional model of a virtual item to produce a second modified three-dimensional model, the modifying including repositioning points on the three-dimensional model to be in relative positions corresponding to the second relative positions of the plurality of points on the real-world item; and
generate second AR content for presentation, the second AR content being based on the second modified three-dimensional model.

19. The system of claim 13, wherein the three-dimensional model of the virtual item is a first three-dimensional model of the virtual item, the relative positions of the plurality of points are first relative positions of the plurality of points, the AR content is first AR content, and the at least one processor is further to:
obtain an instruction to replace the first three-dimensional model of the virtual item with a second three-dimensional model of the virtual item, the instruction originating from user input at a device;
the memory is further to store second relative positions of the plurality of points on the real-world item; and
the at least one processor is further to:
modify the second three-dimensional model of the virtual item, the modifying including repositioning points on the second three-dimensional model to be in relative positions corresponding to the second relative positions of the plurality of points on the real-world item; and
generate second AR content for presentation, the second AR content being based on the modified second three-dimensional model.

20. A non-transitory computer readable medium storing computer executable instructions which, when executed by a computer, cause the computer to perform a method comprising:
determining relative positions of a plurality of points on a real-world item, the relative positions of the plurality of points on the real-world item corresponding to a shape of the real-world item;
modifying a three-dimensional model of a virtual item, the modifying including repositioning points on the three-dimensional model to be in relative positions corresponding to the relative positions of the plurality of points on the real-world item; and
generating augmented reality (AR) content for presentation, the AR content being based on the modified three-dimensional model.

* * * * *